United States Patent
Watanabe et al.

(10) Patent No.: US 8,117,737 B2
(45) Date of Patent: Feb. 21, 2012

(54) METHOD OF MANUFACTURING MAGNETIC HEAD FOR PERPENDICULAR MAGNETIC RECORDING WITH SHIELD AROUND MAIN MAGNETIC POLE

(75) Inventors: Hisayoshi Watanabe, Tokyo (JP); Masachika Hashino, Tokyo (JP); Michitoshi Tsuchiya, Tokyo (JP); Koichi Otani, Tokyo (JP); Tatsuhiro Nojima, Tokyo (JP); Tsutomu Nishinaga, Tokyo (JP); Hideyuki Ukita, Tokyo (JP)

(73) Assignee: TDK Corporation, Tokyo (JP)

( * ) Notice: Subject to any disclaimer, the term of this patent is extended or adjusted under 35 U.S.C. 154(b) by 309 days.

(21) Appl. No.: 12/591,745

(22) Filed: Nov. 30, 2009

(65) Prior Publication Data
US 2011/0127234 A1 Jun. 2, 2011

(51) Int. Cl.
*G11B 5/127* (2006.01)
*H04R 31/00* (2006.01)

(52) U.S. Cl. ............... 29/603.16; 29/603.11; 29/603.13; 29/603.15; 29/603.18; 216/22; 216/39; 216/41; 216/48; 216/65; 360/121; 360/122; 360/317

(58) Field of Classification Search ............... 29/603.07, 29/603.11, 603.13–603.16, 603.18; 216/22, 216/39, 41, 48, 62, 65–67; 360/121, 122, 360/317; 451/5, 41
See application file for complete search history.

(56) References Cited

U.S. PATENT DOCUMENTS

| 5,075,956 | A | 12/1991 | Das |
| 6,665,143 | B2 * | 12/2003 | Yoda et al. ............... 360/119.11 |
| 6,916,597 | B2 | 7/2005 | Kamijima et al. |
| 6,954,340 | B2 | 10/2005 | Shukh et al. |
| 7,100,267 | B2 * | 9/2006 | Yoda et al. ................. 29/603.14 |
| 2001/0028530 | A1 * | 10/2001 | Yoda et al. ..................... 360/125 |
| 2004/0027883 | A1 * | 2/2004 | Yoda et al. ..................... 365/200 |

FOREIGN PATENT DOCUMENTS
JP A-2002-116532 4/2002
* cited by examiner

*Primary Examiner* — Paul D Kim
(74) *Attorney, Agent, or Firm* — Oliff & Berridge, PLC

(57) ABSTRACT

A manufacturing method for a magnetic head includes the steps of: forming a structure on a lower shield, the structure including a lower gap, a main magnetic pole and first and second side gaps; forming first and second side shields; forming an upper gap; and forming an upper shield. In the step of forming the structure, an initial lower gap layer is formed on the lower shield, the initial lower gap layer including a pre-lower-gap portion, and two to-be-removed portions that are located on opposite sides of the pre-lower-gap portion. Then, a protrusion including the main magnetic pole and the first and second side gaps is formed on the pre-lower-gap portion. With the top surface of the protrusion covered with a mask, the initial lower gap layer is etched in part to thereby form the lower gap.

7 Claims, 27 Drawing Sheets

METHOD OF MANUFACTURING MAGNETIC HEAD FOR PERPENDICULAR MAGNETIC RECORDING WITH SHIELD AROUND MAIN MAGNETIC POLE

BACKGROUND OF THE INVENTION

1. Field of the Invention

The present invention relates to a method of manufacturing a magnetic head for perpendicular magnetic recording that is used for recording data on a recording medium by means of a perpendicular magnetic recording system, and more specifically, to a method of manufacturing a magnetic head for perpendicular magnetic recording that has a shield provided around a main magnetic pole.

2. Description of the Related Art

Recently, magnetic recording devices such as a magnetic disk drive have been improved in recording density, and magnetic heads and magnetic recording media of improved performance have been demanded accordingly. The recording systems of magnetic recording devices include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. As compared with the longitudinal magnetic recording system, the perpendicular magnetic recording system is harder to be affected by thermal fluctuation of the recording medium and capable of providing higher linear recording density.

Magnetic heads for perpendicular magnetic recording typically have, as do magnetic heads for longitudinal magnetic recording, a structure in which a reproducing head including a magnetoresistive element (hereinafter, also referred to as an MR element) for reading and a recording head including an induction-type electromagnetic transducer for writing are stacked on a substrate. The recording head includes a main magnetic pole that produces a magnetic field in the direction perpendicular to the plane of the recording medium. The main magnetic pole has an end face located in a medium facing surface that faces the recording medium. To increase the recording density, reduction in track width and improvement in recording characteristics, such as overwrite property which is a parameter indicating an overwriting capability, are required of the recording head of the perpendicular magnetic recording system.

A magnetic head for use in a magnetic disk drive is typically provided in a slider. The slider has the medium facing surface mentioned above. The medium facing surface has an air-inflow-side end and an air-outflow-side end. The slider is configured to slightly fly over the surface of the recording medium by means of an airflow that comes from the air-inflow-side end into the space between the medium facing surface and the recording medium. The magnetic head is typically disposed near the air-outflow-side end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In a magnetic disk drive of the perpendicular magnetic recording system, in particular, which exhibits a better capability of writing on a recording medium compared with the longitudinal magnetic recording system, the skew mentioned above can cause the phenomenon that signals already recorded on one or more tracks that are adjacent to a track targeted for recording are erased or attenuated when recording a signal on the track targeted for recording (such a phenomenon will be hereinafter referred to as adjacent track erase). To increase the recording density, it is required to suppress the adjacent track erase.

One of known techniques for increasing the recording density is to provide a shield having an end face that is located in the medium facing surface and wraps around the end face of the main magnetic pole (such a shield will be hereinafter referred to as a wrap-around shield), as described in U.S. Pat. No. 5,075,956 and U.S. Pat. No. 6,954,340 B2, for example. A gap is provided between the main magnetic pole and the wrap-around shield. The wrap-around shield takes in a magnetic flux that is generated from the end face of the main magnetic pole located in the medium facing surface and that expands in directions other than the direction perpendicular to the plane of the recording medium, so as to prevent the magnetic flux from reaching the recording medium. The wrap-around shield includes a lower shield that is located closer to the air-inflow end of the slider relative to the main magnetic pole, an upper shield that is located closer to the air-outflow end of the slider relative to the main magnetic pole, and first and second side shields that are located on opposite sides of the main magnetic pole in the track width direction. The gap includes a lower gap that is interposed between the main magnetic pole and the lower shield, an upper gap that is interposed between the main magnetic pole and the upper shield, and two side gaps that are interposed between the main magnetic pole and the two side shields. According to this technique, the lower shield and the upper shield serve to increase the gradient of the recording magnetic field, and the two side shields serve to suppress adjacent track erase. Increasing the recording density is made possible by these functions.

Here, a method of forming the wrap-around shield will be discussed. A possible method of forming the wrap-around shield is as follows. First, the lower shield is formed on an underlayer for the lower shield. Next, an initial lower gap layer, which is intended to later become the lower gap, is formed on the lower shield. Next, the main magnetic pole is formed on the initial lower gap layer. Next, an initial side gap layer including the two side gaps is formed to cover the entire main magnetic pole and the top surface of the initial lower gap layer. Next, a mask is formed to cover the entire main magnetic pole and a part of the initial side gap layer. The mask is formed by patterning a photoresist layer by photolithography, for example. Next, the other part of the initial side gap layer which is uncovered with the mask and a part of the initial lower gap layer lying below that part of the initial side gap layer are removed by etching. This exposes a part of the top surface of the lower shield and makes the remaining initial lower gap layer into the lower gap. Next, the two side shields, the upper gap, and the upper shield are formed.

In the foregoing method of forming the wrap-around shield, etching the respective parts of the initial side gap layer and the initial lower gap layer using the foregoing mask forms a structure that includes the lower gap having a width greater than that of the main magnetic pole, and the main magnetic pole and the initial side gap layer which are arranged on the lower gap. In such a structure, the initial side gap layer includes two portions that lie on the top surface of the lower gap at positions on opposite sides of the main magnetic pole in the track width direction.

The foregoing method of forming the wrap-around shield has two problems as described below. A first problem is that the lower gap and the two portions of the initial side gap layer lying on the top surface of the lower gap create two corner parts near the bottom surface of the main magnetic pole, the two corner parts being formed between respective two intersecting surfaces at, e.g., right angles, and the two corner parts can induce adjacent track erase. More specifically, if such two corner parts are created, then two recesses are formed in the two side shields along the two corner parts. Magnetic fluxes emerging from the recording medium and from the main magnetic pole tend to concentrate in the vicinities of the two recesses, and this can induce adjacent track erase.

A second problem is that the center of the mask in the track width direction can deviate from the center of the main magnetic pole in the track width direction, so that the effects of the two side shields become non-equal. More specifically, when the center of the mask in the track width direction deviates from the center of the main magnetic pole in the track width direction, the center of the lower gap in the track width direction deviates from the center of the main magnetic pole in the track width direction. Then, the distance between the surface of the first side shield in contact with one of the side surfaces of the lower gap and the center of the main magnetic pole in the track width direction differs from the distance between the surface of the second side shield in contact with the other side surface of the lower gap and the center of the main magnetic pole in the track width direction. This makes the effects of the two side shields not equal, and can thus cause a deterioration of the characteristics of the magnetic head.

OBJECT AND SUMMARY OF THE INVENTION

It is an object of the present invention to provide a method of manufacturing a magnetic head for perpendicular magnetic recording that includes a shield having an end face located in the medium facing surface to wrap around the end face of the main magnetic pole, the shield including a lower shield, an upper shield, and two side shields, the method being capable of suppressing the adjacent track erase and making the effects of the two side shields equal.

A magnetic head for perpendicular magnetic recording that is manufactured by a manufacturing method of the present invention includes: a medium facing surface that faces a recording medium; a coil that produces a magnetic field corresponding to data to be recorded on the recording medium; a main magnetic pole that has an end face located in the medium facing surface, allows a magnetic flux corresponding to the magnetic field produced by the coil to pass, and produces a recording magnetic field for recording the data on the recording medium by means of a perpendicular magnetic recording system; a shield having an end face that is located in the medium facing surface to wrap around the end face of the main magnetic pole; and a gap made of a nonmagnetic material and provided between the main magnetic pole and the shield.

The main magnetic pole has a first side surface and a second side surface that are located at opposite ends in the track width direction. The shield includes a lower shield, an upper shield, and first and second side shields. The gap includes a lower gap, an upper gap, and first and second side gaps. The lower gap, the main magnetic pole, the upper gap, and the upper shield are arranged in this order on the lower shield. The first side gap is in contact with the first side surface of the main magnetic pole. The second side gap is in contact with the second side surface of the main magnetic pole. The first side shield is located at such a position as to sandwich the first side gap between itself and the first side surface of the main magnetic pole, and is magnetically coupled to the lower shield and the upper shield. The second side shield is located at such a position as to sandwich the second side gap between itself and the second side surface of the main magnetic pole, and is magnetically coupled to the lower shield and the upper shield.

The manufacturing method for the magnetic head for perpendicular magnetic recording of the present invention includes the steps of forming the lower shield; forming a structure on the lower shield, the structure including the lower gap, the main magnetic pole and the first and second side gaps; forming the first and second side shields; forming the upper gap; forming the upper shield; and forming the coil.

The step of forming the structure includes: the step of forming an initial lower gap layer on the lower shield, the initial lower gap layer including a pre-lower-gap portion that is intended to later become the lower gap, and two to-be-removed portions that are located on opposite sides of the pre-lower-gap portion in the track width direction and intended to be removed later; the step of forming the main magnetic pole on the pre-lower-gap portion; the step of forming the first and second side gaps on the first and second side surfaces of the main magnetic pole so that a protrusion is produced on the pre-lower-gap portion, the protrusion including the main magnetic pole and the first and second side gaps and protruding upward from the top surface of the initial lower gap layer; the step of forming a resin layer so as not to lie on the top surface of the protrusion but to lie on opposite sides of the protrusion in the track width direction, in contact with opposite side surfaces of the protrusion in the track width direction, the resin layer being developer-soluble and non-photosensitive; the step of forming a photoresist layer to cover the resin layer and the protrusion; the step of patterning the photoresist layer by photolithography including exposure and development, thereby forming a mask that covers the top surface of the protrusion and removing the resin layer by dissolution in a developer that is used in the development; and an etching step of etching the initial lower gap layer in part with the top surface of the protrusion covered with the mask, so that the two to-be-removed portions are removed and the pre-lower-gap portion becomes the lower gap.

In the manufacturing method of the present invention, in the medium facing surface, the positions of opposite ends of the top surface of the lower gap in the track width direction coincide with the positions of opposite ends of the bottom surface of the protrusion in the track width direction after the etching step.

In the manufacturing method of the present invention, the width of the mask in the track width direction may be greater than the width of the top surface of the protrusion in the track width direction. In this case, the top surface of the resin layer may have a maximum height lower than the top surface of the protrusion. The mask may cover the top surface of the protrusion and respective portions of the side surfaces of the protrusion that are continuous with the top surface.

In the manufacturing method of the present invention, the step of forming the resin layer may include the steps of: forming an initial resin layer to cover the top surface and the side surfaces of the protrusion, the initial resin layer being intended to later become the resin layer; and partially removing the initial resin layer so that the top surface of the protrusion is exposed and the initial resin layer becomes the resin layer.

In the manufacturing method of the present invention, the step of forming the first and second side gaps may form an initial side gap layer that includes the first and second side gaps and two unnecessary portions, the two unnecessary portions being located on the two to-be-removed portions of the initial lower gap layer and intended to be removed later. The etching step may remove the two unnecessary portions of the initial side gap layer so that the shape of the protrusion after the etching step is determined.

In the manufacturing method of the present invention, after the etching step, the width of the bottom surface of the protrusion in the track width direction may be smaller than the width of the top surface of the protrusion in the track width direction.

The manufacturing method of the present invention may further include the step of etching the top surface of the main magnetic pole in part, to be performed between the step of forming the structure and the step of forming the upper gap.

According to the manufacturing method for a magnetic head for perpendicular magnetic recording of the present invention, in the medium facing surface, the positions of opposite ends of the top surface of the lower gap in the track width direction coincide with the positions of opposite ends of the bottom surface of the protrusion in the track width direction after the etching step. According to the present invention, no corner parts are therefore formed by the lower gap and the two side gaps near the bottom surface of the main magnetic pole. Consequently, according to the present invention, it is possible to suppress adjacent track erase.

In the present invention, the positions of opposite ends of the top surface of the lower gap in the track width direction are determined not by the mask but by the positions of opposite ends of the bottom surface of the protrusion in the track width direction after the etching step. The positions of opposite ends of the bottom surface of the protrusion in the track width direction are almost constant even if the mask is somewhat misaligned. According to the present invention, it is therefore possible to prevent the center of the lower gap in the track width direction from deviating from the center of the main magnetic pole in the track width direction even if the mask is somewhat misaligned. Consequently, according to the present invention, it is possible to make the effects of the two side shields equal.

In the present invention, the mask protects the vicinity of the top surface of the protrusion in the etching step. The present invention thus makes it possible to prevent the shapes of the main magnetic pole and the two side gaps near the top surface of the main magnetic pole, which have a significant impact on the characteristics of the magnetic head, from being changed in the etching step. Consequently, according to the present invention, it is possible to prevent changes in characteristics of the magnetic head.

Other objects, features and advantages of the present invention will become fully apparent from the following description.

DETAILED DESCRIPTION OF THE PREFERRED EMBODIMENT

Figure 6:
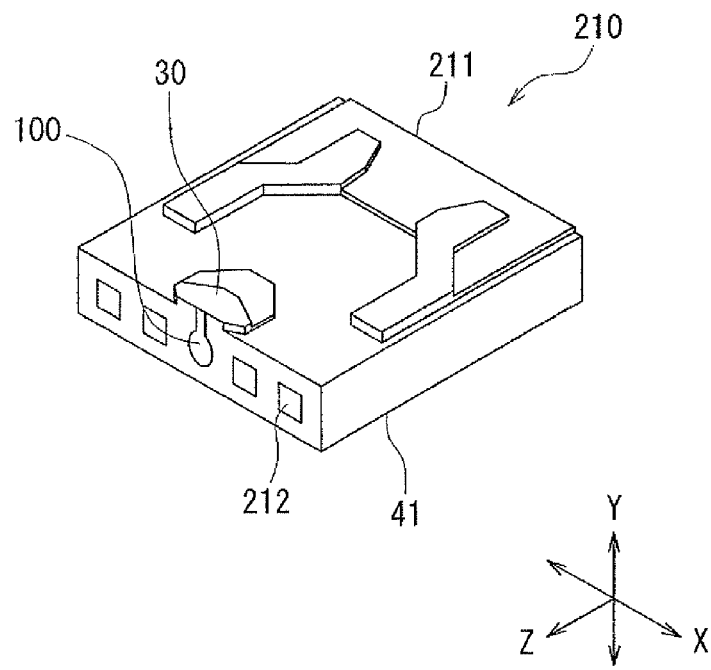
FIG. 6 is a perspective view showing a slider including the magnetic head according to the embodiment of the invention.

A preferred embodiment of the present invention will now be described in detail with reference to the drawings. Reference is first made to FIG. 6 to describe a slider 210 including a magnetic head for perpendicular magnetic recording (hereinafter, simply referred to as a magnetic head) according to the embodiment of the invention. In a magnetic recording device, the slider 210 is disposed to face a circular-plate-shaped recording medium (a magnetic disk) that is driven to rotate. In FIG. 6, the X direction is a direction across the tracks of the recording medium, the Y direction is a direction perpendicular to the surface of the recording medium, and the Z direction is the direction of travel of the recording medium as seen from the slider 210. The X, Y and Z directions are orthogonal to one another. The slider 210 has a base body 211. The base body 211 is nearly hexahedron-shaped. One of the six surfaces of the base body 211 is designed to face the surface of the recording medium. At this one of the six surfaces, there is formed a medium facing surface 30 to face the recording medium. When the recording medium rotates and travels in the Z direction, an airflow passing between the recording medium and the slider 210 causes a lift below the slider 210 in the Y direction of FIG. 6. This lift causes the slider 210 to fly over the surface of the recording medium. The magnetic head 100 according to the present embodiment is formed near the air-outflow-side end (the end in the Z direction) of the slider 210. A plurality of terminals 212 are also provided at the air-outflow-side end of the slider 210.

A head assembly according to the present embodiment will now be described with reference to FIG. 7. The head assembly according to the present embodiment includes the slider 210 shown in FIG. 6 and a supporter that flexibly supports the slider 210. Forms of the head assembly include a head gimbal assembly and a head arm assembly described below.

The head gimbal assembly 220 will be first described. The head gimbal assembly 220 includes the slider 210, and a suspension 221 serving as the supporter that flexibly supports the slider 210. The suspension 221 includes: a plate-spring-shaped load beam 222 formed of, e.g., stainless steel; a flexure 223 to which the slider 210 is joined, the flexure 223 being provided at an end of the load beam 222 and giving an appropriate degree of freedom to the slider 210; and a base plate 224 provided at the other end of the load beam 222. The base plate 224 is configured to be attached to an arm 230 of an actuator for moving the slider 210 along the X direction across the tracks of the recording medium 262. The actuator has the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms with a plurality of head gimbal assemblies 220 respectively attached to the arms is called a head stack assembly.

Figure 7:
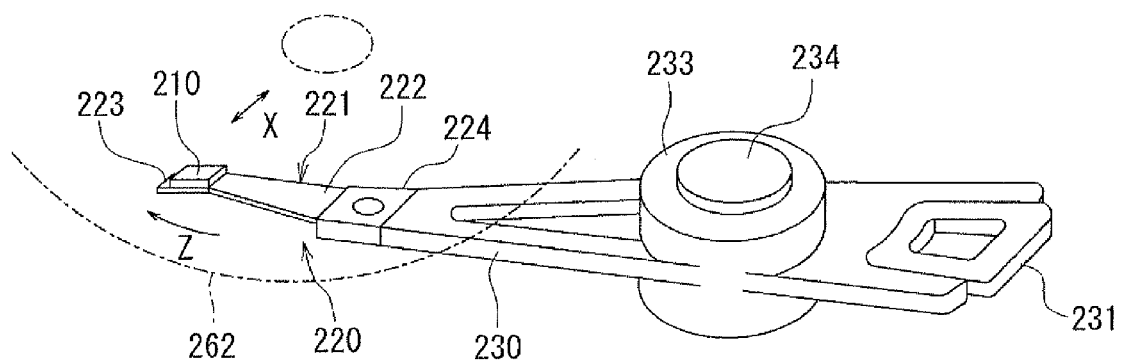
FIG. 7 is a perspective view showing a head arm assembly according to the embodiment of the invention.

FIG. 7 shows the head arm assembly according to the present embodiment. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to a shaft 234 for rotatably supporting the arm 230.

Figure 8:
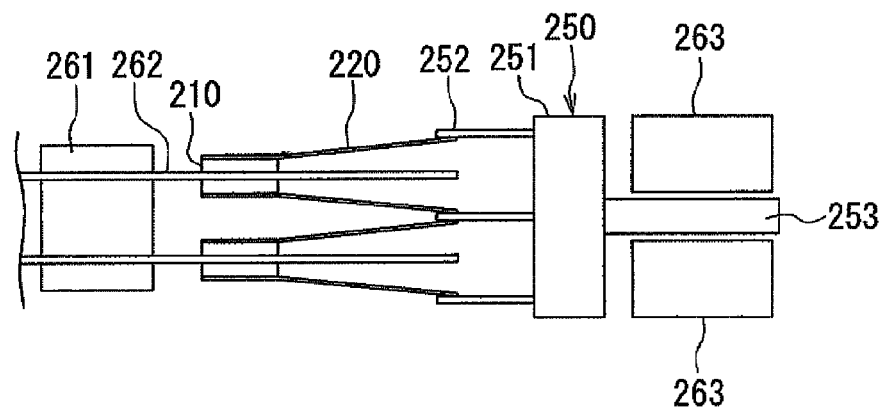
FIG. 8 is an explanatory diagram for explaining the main part of a magnetic recording device according to the embodiment of the invention.
Figure 9:
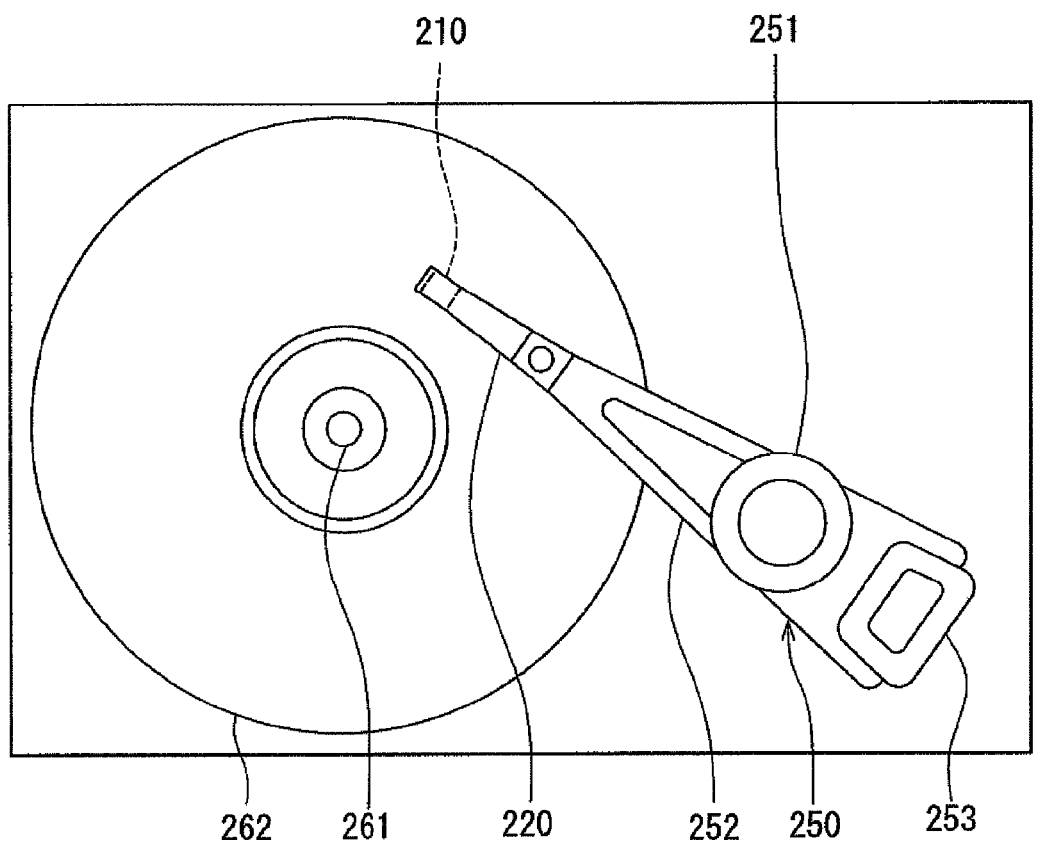
FIG. 9 is a plan view of the magnetic recording device according to the embodiment of the invention.

Reference is now made to FIG. 8 and FIG. 9 to describe an example of the head stack assembly and the magnetic recording device according to the present embodiment. FIG. 8 is an explanatory diagram showing the main part of the magnetic recording device. FIG. 9 is a plan view of the magnetic recording device. The head stack assembly 250 includes a carriage 251 having a plurality of arms 252. A plurality of head gimbal assemblies 220 are attached to the arms 252 such that the assemblies 220 are aligned in the vertical direction with spacing between every adjacent ones. A coil 253 that is part of the voice coil motor is mounted on a side of the carriage 251 opposite to the arms 252. The head stack assembly 250 is installed in the magnetic recording device. The magnetic recording device includes a plurality of recording media 262 mounted on a spindle motor 261. Two sliders 210 are allocated to each recording medium 262 such that the two sliders 210 are opposed to each other with the recording medium 262 located therebetween. The voice coil motor includes permanent magnets 263 arranged to be opposed to each other with the coil 253 of the head stack assembly 250 located therebetween. The actuator and the head stack assembly 250 except the sliders 210 support the sliders 210 and position them with respect to the recording media 262.

In the magnetic recording device according to the present embodiment, the actuator moves the slider 210 across the tracks of the recording medium 262 and positions the slider 210 with respect to the recording medium 262. The magnetic head included in the slider 210 records data on the recording medium 262 by using the recording head, and reproduces data stored on the recording medium 262 by using the reproducing head.

Figure 1:
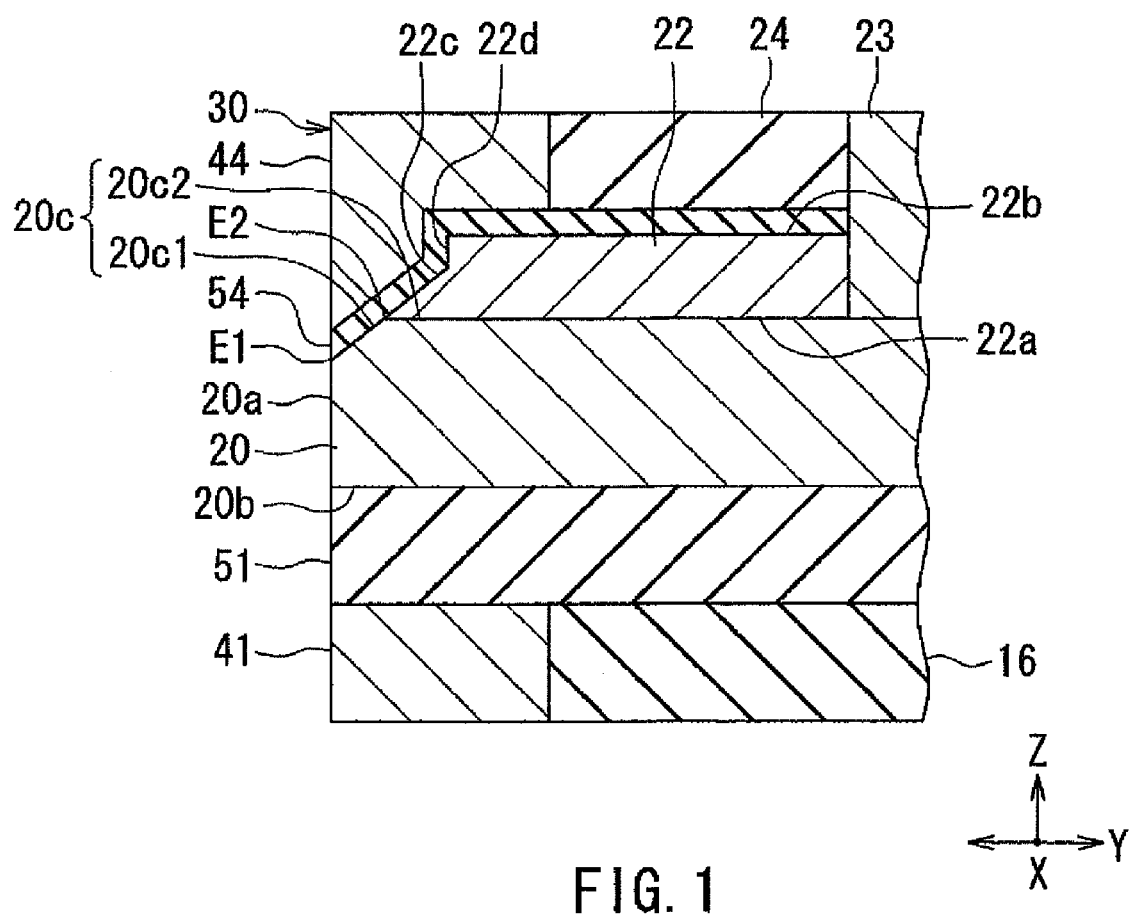
FIG. 1 is a cross-sectional view showing the main part of a magnetic head according to an embodiment of the invention.
Figure 2:
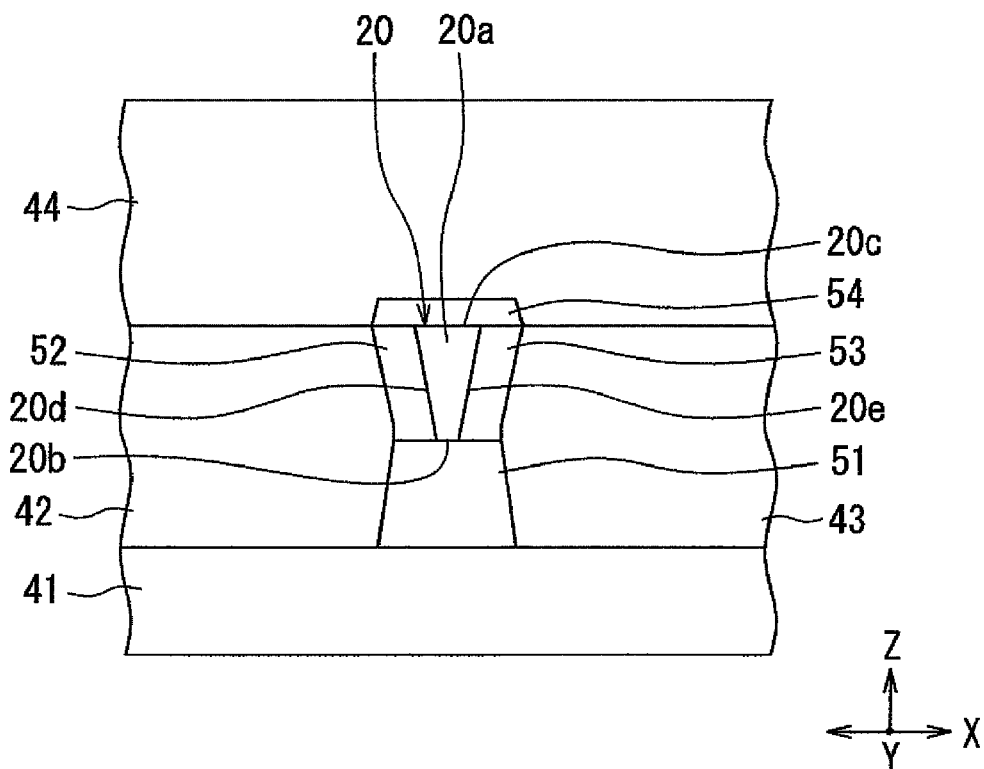
FIG. 2 is a front view showing a part of the medium facing surface of the magnetic head according to the embodiment of the invention.
Figure 3:
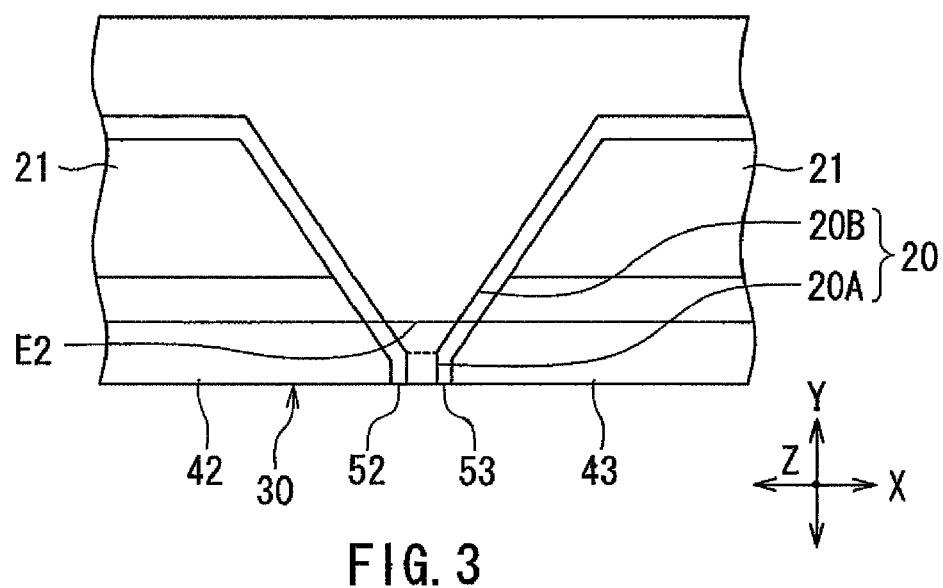
FIG. 3 is a plan view showing a part of the main magnetic pole and the vicinity thereof in the magnetic head according to the embodiment of the invention.
Figure 4:
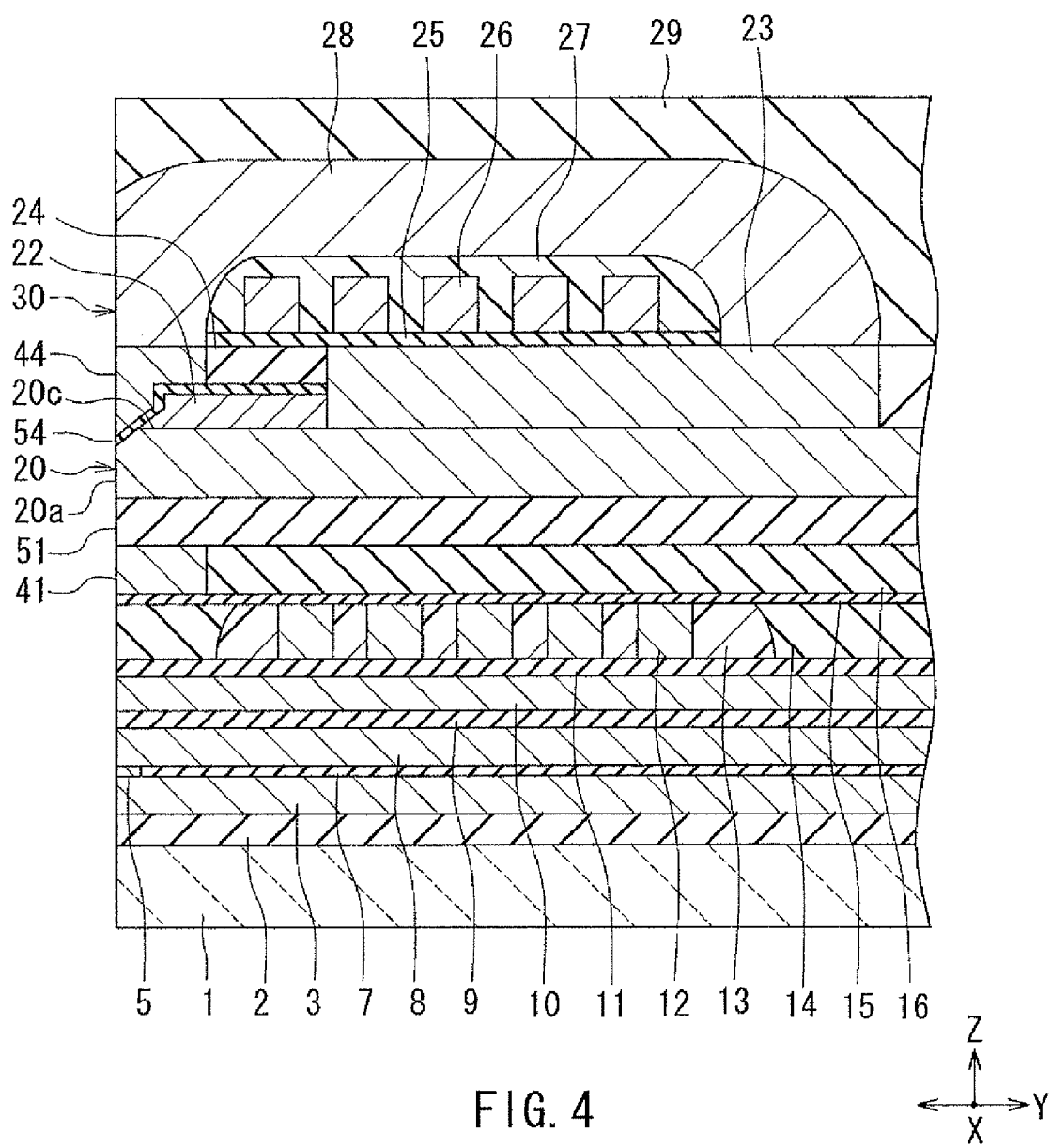
FIG. 4 is a cross-sectional view showing the configuration of the magnetic head according to the embodiment of the invention.
Figure 5:
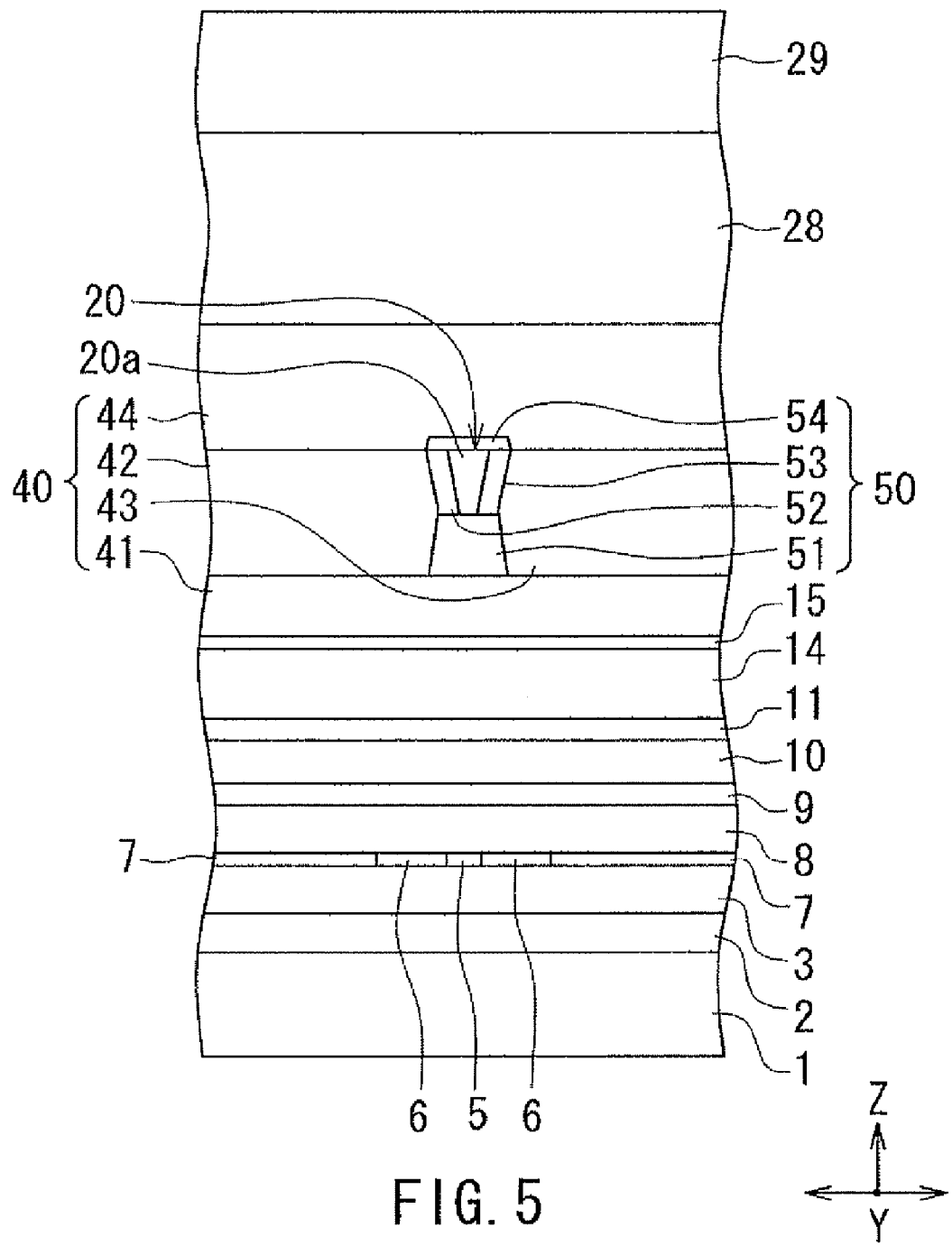
FIG. 5 is a front view showing the medium facing surface of the magnetic head according to the embodiment of the invention.

Reference is now made to FIG. 1 to FIG. 5 to describe the configuration of the magnetic head according to the present embodiment. FIG. 1 is a cross-sectional view showing the main part of the magnetic head. FIG. 2 is a front view showing a part of the medium facing surface of the magnetic head. FIG. 3 is a plan view showing a part of the main magnetic pole and the vicinity thereof in the magnetic head. FIG. 4 is a cross-sectional view showing the configuration of the magnetic head. FIG. 5 is a front view showing the medium facing surface of the magnetic head. Note that FIG. 1 and FIG. 4 each show a cross section perpendicular to the medium facing surface and the top surface of the substrate. The X, Y and Z directions shown in FIG. 6 are also shown in FIG. 1 to FIG. 5. In FIG. 1 and FIG. 4, the X direction is orthogonal to the Y and Z directions. In FIG. 2 and FIG. 5, the Y direction is orthogonal to the X and Z directions. In FIG. 3, the Z direction is orthogonal to the X and Y directions. The track width direction in the magnetic head is the same as the X direction.

As shown in FIG. 4, the magnetic head according to the present embodiment has the medium facing surface 30 that faces the recording medium. As shown in FIG. 4 and FIG. 5, the magnetic head includes a substrate 1 made of a ceramic material such as aluminum oxide-titanium carbide ($Al_2O_3$—TiC), an insulating layer 2 disposed on the substrate 1, and a first reproduction shield layer 3 that is made of a magnetic material and disposed on the insulating layer 2.

The magnetic head further includes a magnetoresistive (MR) element 5 as a reproducing element disposed on the first reproduction shield layer 3, and two bias magnetic field applying layers 6 that are located on opposite sides of the MR element 5 in the track width direction and apply a bias magnetic field to the MR element 5. Note that not-shown insulating films are respectively provided between each bias magnetic field applying layer 6 and the first reproduction shield layer 3, and between each bias magnetic field applying layer 6 and the MR element 5. The magnetic head further includes an insulating layer 7 disposed around the MR element 5 and the bias magnetic field applying layers 6 on the first reproduction shield layer 3, and a second reproduction shield layer 8 made of a magnetic material and disposed over the MR element 5, the bias magnetic field applying layers 6 and the insulating layer 7.

An end of the MR element 5 is located in the medium facing surface 30. The MR element 5 may be a giant magnetoresistive (GMR) element or a tunneling magnetoresistive (TMR) element, for example. The GMR element may be of either the current-in-plane (CIP) type in which a sense current for detecting magnetic signals is fed in a direction nearly parallel to the plane of layers constituting the GMR element or the current-perpendicular-to-plane (CPP) type in which the sense current is fed in a direction nearly perpendicular to the plane of layers constituting the GMR element.

If the MR element 5 is a TMR element or a CPP-type GMR element, the first reproduction shield layer 3 and the second reproduction shield layer 8 may also function as electrodes for feeding the sense current to the MR element 5. FIG. 4 shows the case where the MR element 5 is a TMR element or a CPP-type GMR element. If the MR element 5 is a CIP-type GMR element, insulating films are respectively provided between the MR element 5 and the first reproduction shield layer 3 and between the MR element 5 and the second reproduction shield layer 8, and two wiring layers for feeding the sense current to the MR element 5 are provided between these insulating films.

The magnetic head further includes a nonmagnetic layer 9 and a third reproduction shield layer 10 that are arranged in this order on the second reproduction shield layer 8. The nonmagnetic layer 9 is made of a nonmagnetic material such as alumina. The third reproduction shield layer 10 is made of a magnetic material. The parts from the first reproduction shield layer 3 to the third reproduction shield layer 10 constitute the reproducing head.

The magnetic head further includes: an insulating layer 11 made of an insulating material and disposed on the third reproduction shield layer 10; a coil 12 disposed on the insulating layer 11; an insulating layer 13 made of an insulating material and disposed around the coil 12 and in the space between every adjacent turns of the coil 12; and an insulating layer 14 made of an insulating material and disposed around the insulating layer 13. The coil 12 is planar spiral-shaped. The coil 12 and the insulating layers 13 and 14 are flattened at the top. The insulating layers 11 and 14 are made of alumina, for example. The insulating layer 13 is made of photoresist, for example. The coil 12 is made of a conductive material such as copper. The magnetic head further includes an insulating layer 15 made of an insulating material and disposed over the top surfaces of the coil 12 and the insulating layers 13 and 14. The insulating layer 15 is made of alumina, for example.

The magnetic head further includes a main magnetic pole 20 made of a magnetic material, a shield 40 made of a magnetic material, and a gap 50 made of a nonmagnetic material and provided between the main magnetic pole and the shield.

As shown in FIG. 1 and FIG. 2, the main magnetic pole 20 has an end face 20a located in the medium facing surface 30, a bottom surface 20b, a top surface 20c, and a first side surface 20d and a second side surface 20e located at opposite ends in the track width direction. The shield 40 has an end face that is located in the medium facing surface 30 to wrap around the end face 20a of the main magnetic pole 20.

The main magnetic pole 20 and the shield 40 may each be made of NiFe, CoFe, CoNiFe, CoNi, FeCo, or FeNi. The nonmagnetic material used to form the gap 50 may be an insulating material or a nonmagnetic metal material. The material used for the gap 50 may be alumina, for example.

The shield 40 includes a lower shield 41, an upper shield 44, a first side shield 42, and a second side shield 43 that have their respective end faces located in the medium facing surface 30. The gap 50 includes a lower gap 51, an upper gap 54, a first side gap 52, and a second side gap 53 that have their respective end faces located in the medium facing surface 30.

The lower shield 41 is disposed on the insulating layer 15. The magnetic head further includes a nonmagnetic layer 16 made of a nonmagnetic material and disposed around the lower shield 41 on the insulating layer 15. The lower shield 41 and the nonmagnetic layer 16 are flattened at the top. The nonmagnetic layer 16 is made of alumina, for example.

The lower gap 51, the main magnetic pole 20, the upper gap 54, and the upper shield 44 are arranged in this order on top of the lower shield 41 and the nonmagnetic layer 16. The first side gap 52 is in contact with the first side surface 20d of the main magnetic pole 20. The second side gap 53 is in contact with the second side surface 20e of the main magnetic pole 20. The first side shield 42 is located on the lower shield 41 at such a position as to sandwich the first side gap 52 between itself and the first side surface 20d of the main magnetic pole 20, and is magnetically coupled to the lower shield 41 and the upper shield 44. The second side shield 43 is located on the lower shield 41 at such a position as to sandwich the second side gap 53 between itself and the second side surface 20e of the main magnetic pole 20, and is magnetically coupled to the lower shield 41 and the upper shield 44.

As shown in FIG. 3, the magnetic head further includes a nonmagnetic layer 21 disposed around the main magnetic pole 20, the side gaps 52 and 53 and the side shields 42 and 43. The nonmagnetic layer 21 is made of alumina, for example.

The magnetic head further includes a nonmagnetic layer 22 made of a nonmagnetic material and disposed on a part of the top surface of the main magnetic pole 20. The nonmagnetic layer 22 may be composed of a single layer or a plurality of layers. The nonmagnetic material used to form the nonmagnetic layer 22 may be an insulating material or a nonmagnetic metal material. The shape of the nonmagnetic layer 22 will be described in detail later.

The upper gap 54 is disposed on the main magnetic pole 20 and the nonmagnetic layer 22. As shown in FIG. 4, a part of the top surface 20c of the main magnetic pole 20 away from the medium facing surface 30 is not covered with the nonmagnetic layer 22 and the upper gap 54.

The magnetic head further includes a yoke layer 23 disposed on the part of the top surface 20c of the main magnetic pole 20 away from the medium facing surface 30. The yoke layer 23 is made of a magnetic material. The material of the yoke layer 23 may be NiFe, CoFe, CoNiFe, CoNi, FeCo, or FeNi.

The magnetic head further includes a nonmagnetic layer 24 made of a nonmagnetic material and disposed around the upper shield 44 and the yoke layer 23. The upper shield 44, the yoke layer 23 and the nonmagnetic layer 24 are flattened at the top. The nonmagnetic material used to form the nonmagnetic layer 24 may be an insulating material or a nonmagnetic metal material.

The magnetic head further includes: an insulating layer 25 disposed over areas of the top surfaces of the yoke layer 23 and the nonmagnetic layer 24 above which a coil 26 mentioned below is to be disposed; the coil 26 disposed on the insulating layer 25; and an insulating layer 27 covering the coil 26. The insulating layer 25 is made of alumina, for example. The coil 26 is planar spiral-shaped. The coil 26 is made of a conductive material such as copper. The insulating layer 27 is made of photoresist, for example.

The magnetic head further includes a return yoke layer 28 disposed over the upper shield 44, the insulating layer 27 and the yoke layer 23. The return yoke layer 28 magnetically couples the upper shield 44 and the yoke layer 23 to each other. A part of the coil 26 passes between the yoke layer 23 and the return yoke layer 28. The return yoke layer 28 is made of a magnetic material. The material of the return yoke layer 28 may be NiFe, CoFe, CoNiFe, CoNi, FeCo, or FeNi, for example.

The magnetic head further includes a protection layer 29 that is made of an insulating material such as alumina and disposed to cover the return yoke layer 28. The parts from the coil 12 to the return yoke layer 28 constitute the recording head.

As has been described, the magnetic head according to the present embodiment includes the medium facing surface 30 that faces the recording medium, the reproducing head, and the recording head. The reproducing head and the recording head are stacked on the substrate 1. The reproducing head is disposed backward along the direction of travel of the recording medium (the Z direction) (in other words, disposed closer to the air inflow end of the slider), while the recording head is disposed forward along the direction of travel of the recording medium (in other words, disposed closer to the air outflow end of the slider).

The reproducing head includes: the MR element 5 as the reproducing element; the first reproduction shield layer 3 and the second reproduction shield layer 8 for shielding the MR element 5, the shield layers 3 and 8 having respective portions that are located near the medium facing surface 30 and are opposed to each other with the MR element 5 therebetween; and the two bias magnetic field applying layers 6 disposed on opposite sides of the MR element 5 in the track width direction.

The recording head includes the coil 12, the main magnetic pole 20, the shield 40, the gap 50, the nonmagnetic layer 22, the yoke layer 23, the coil 26, and the return yoke layer 28. When a recording electric current is supplied to the coils 12 and 26, the coils 12 and 26 produce magnetic fields in opposite directions at their respective centers. The coil 26 produces a magnetic field corresponding to data to be recorded on the recording medium. The coil 12 produces a magnetic field that prevents the magnetic field produced by the coil 26 from affecting the reproducing head. Note that the coil 12 is not an essential component of the recording head and can be dispensed with.

As shown in FIG. 2, the main magnetic pole 20 has the end face 20a located in the medium facing surface 30, the bottom surface 20b, the top surface 20c, and the first side surface 20d and the second side surface 20e that are located at opposite ends in the track width direction. The width of the end face 20a decreases with decreasing distance to the top surface of the substrate 1. The main magnetic pole 20 allows a magnetic flux corresponding to the magnetic field produced by the coil 26 to pass, and produces a recording magnetic field for recording data on the recording medium by means of the perpendicular magnetic recording system.

As shown in FIG. 5, the shield 40 has an end face that is located in the medium facing surface 30 to wrap around the end face 20a of the main magnetic pole 20. The shield 40 includes the lower shield 41, the upper shield 44, the first side shield 42, and the second side shield 43. The gap 50 is provided between the main magnetic pole 20 and the shield 40. The gap 50 includes the lower gap 51, the upper gap 54, the first side gap 52, and the second side gap 53.

In the medium facing surface 30, the end face of the upper shield 44 is located forward of the end face 20a of the main magnetic pole 20 along the direction of travel of the recording medium (the Z direction) with a predetermined distance provided therebetween by the thickness of the upper gap 54. The thickness of the upper gap 54 is preferably equal to or smaller than 200 nm, or more preferably within the range of 25 to 50 nm, so that the upper shield 44 can fully exhibit its function as a shield.

The position of the end of a bit pattern to be recorded on the recording medium depends on the position of an edge of the end face 20a of the main magnetic pole 20 located in the medium facing surface 30, the edge being closer to the upper gap 54. The shield 40 takes in a magnetic flux that is generated from the end face 20a of the main magnetic pole 20 located in the medium facing surface 30 and that expands in directions other than the direction perpendicular to the plane of the recording medium, so that the magnetic flux is prevented from reaching the recording medium. This allows improving the recording density. In the present embodiment, in particular, the lower shield 41 and the upper shield 44 serve to increase the gradient of the recording magnetic field, and the side shields 42 and 43 serve to suppress adjacent track erase. The improvement of recording density is made possible by these functions.

The shield 40 also takes in a disturbance magnetic field that is applied to the magnetic head from the outside thereof. This makes it possible to prevent erroneous recording on the recording medium caused by the disturbance magnetic field intensively taken into the main magnetic pole 20. The shield 40, the return yoke layer 28 and the yoke layer 23 also have the function of returning a magnetic flux that has been generated from the end face of the main magnetic pole 20 and has magnetized the recording medium.

A detailed description will now be given of the shapes of the main magnetic pole 20 and the nonmagnetic layer 22 with reference to FIG. 1 and FIG. 3. As shown in FIG. 1, the top surface 20c of the main magnetic pole 20 includes a first part 20c1 and a second part 20c2. The first part 20c1 has a first edge E1 located in the medium facing surface 30, and a second edge E2 opposite thereto. The second part 20c2 is located farther from the medium facing surface 30 than is the first part 20c1 and connected to the first part 20c1 at the second edge E2.

The distance from the top surface of the substrate 1 to an arbitrary point on the first part 20c1 increases with increasing distance from the arbitrary point to the medium facing surface 30. The angle of inclination of the first part 20c1 with respect to the direction perpendicular to the medium facing surface 30 (the Y direction) is within the range of 15 to 35 degrees, for example.

The nonmagnetic layer 22 is disposed on the second part 20c2. The nonmagnetic layer 22 has a bottom surface 22a that is in contact with the second part 20c2, and a top surface 22b opposite to the bottom surface 22a. The position of the end of the bottom surface 22a closer to the medium facing surface 30 coincides with the position of the second edge E2. The nonmagnetic layer 22 further has an oblique surface 22c and a connecting surface 22d. The oblique surface 22c has an end that coincides with the end of the bottom surface 22a closer to the medium facing surface 30. The connecting surface 22d connects the end of the oblique surface 22c farther from the medium facing surface 30 and the end of the top surface 22b closer to the medium facing surface 30. The distance from the top surface of the substrate 1 to an arbitrary point on the oblique surface 22c increases with increasing distance from the arbitrary point to the medium facing surface 30. The angle of inclination of the oblique surface 22c with respect to the direction perpendicular to the medium facing surface 30 (the Y direction) is equal to or approximately equal to the angle of inclination of the first part 20c1 with respect to the direction perpendicular to the medium facing surface 30. The connecting surface 22d is parallel to the medium facing surface 30, for example.

The upper gap 54 is disposed to cover the first part 20c1 of the top surface 20c of the main magnetic pole 20 and the oblique surface 22c, the connecting surface 22d and the top surface 22b of the nonmagnetic layer 22.

The upper shield 44 has a bottom surface in contact with the upper gap 54. The bottom surface of the upper shield 44 bends to be opposed to the main magnetic pole 20 and the nonmagnetic layer 22, with the upper gap 54 interposed between the upper shield 44 and each of the main magnetic pole 20 and the nonmagnetic layer 22. The distance between the bottom surface of the upper shield 44 and the second part 20c2 is greater than the distance between the bottom surface of the upper shield 44 and the first part 20c1.

As shown in FIG. 3, the main magnetic pole 20 includes a track width defining portion 20A and a wide portion 20B. An end of the track width defining portion 20A is located in the medium facing surface 30. The wide portion 20B is coupled to the other end of the track width defining portion 20A and is greater in width than the track width defining portion 20A. The track width defining portion 20A has a nearly uniform width.

FIG. 3 shows an example where the distance from the medium facing surface 30 to the boundary between the track width defining portion 20A and the wide portion 20B is smaller than the distance from the medium facing surface 30 to the second edge E2. However, the distance from the medium facing surface 30 to the boundary between the track width defining portion 20A and the wide portion 20B may be equal to or greater than the distance from the medium facing surface 30 to the second edge E2.

A manufacturing method for the magnetic head according to the present embodiment will now be described with reference to FIG. 10A to FIG. 25C. FIG. 10A to FIG. 25C each show a stack of layers in the process of manufacturing the magnetic head. The portions lying below the lower shield 41 and the nonmagnetic layer 16 are omitted in FIG. 10A to FIG. 25C.

Of FIG. 10A to FIG. 25C, FIG. nA and FIG. nB (n is any integer between 10 and 25 inclusive) are cross-sectional views of the stack. FIG. nC is a plan view of the stack. FIG. nA shows a cross section taken at the position where the medium facing surface 30 is to be formed later. FIG. nB shows a cross section perpendicular to the medium facing surface 30 and the top surface of the substrate 1. In FIG. nB and FIG. nC, the position of the cross section of FIG. nA is shown by the line nA-nA.

In the manufacturing method for the magnetic head according to the present embodiment, first, the insulating layer 2 and the first reproduction shield layer 3 are formed in this order on the substrate 1, as shown in FIG. 4. Next, the MR element 5, the two bias magnetic field applying layers 6 and the insulating layer 7 are formed on the first reproduction shield layer 3. Next, the second reproduction shield layer 8, the nonmagnetic layer 9, the third reproduction shield layer 10 and the insulating layer 11 are formed in this order over the MR element 5, the bias magnetic field applying layers 6 and the insulating layer 7. Next, the coil 12 and the insulating layers 13 and 14 are formed on the insulating layer 11. The coil 12 and the insulating layers 13 and 14 are then flattened at the top by chemical mechanical polishing (hereinafter referred to as CMP), for example. Next, the insulating layer 15 is formed over the top surfaces of the coil 12 and the insulating layers 13 and 14.

Figure 10A:
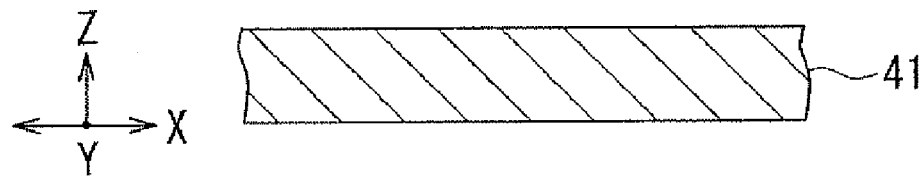
FIG. 10A to FIG. 10C are explanatory diagrams showing a step of a manufacturing method for the magnetic head according to the embodiment of the invention.
Figure 10B:
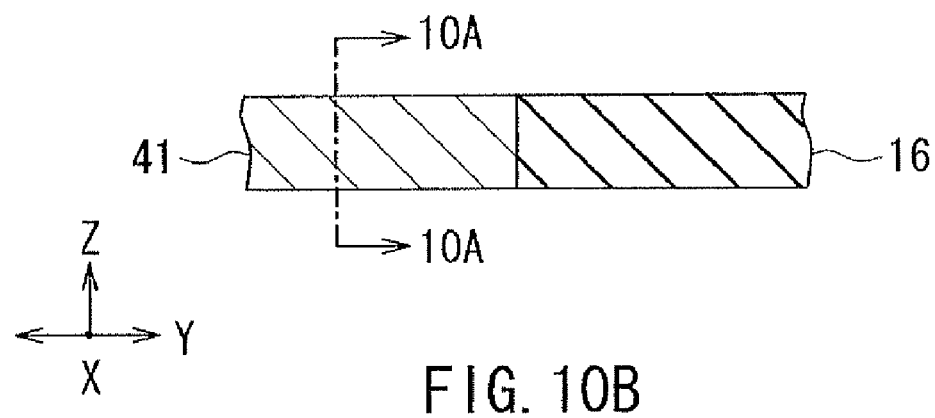
Figure 10C:
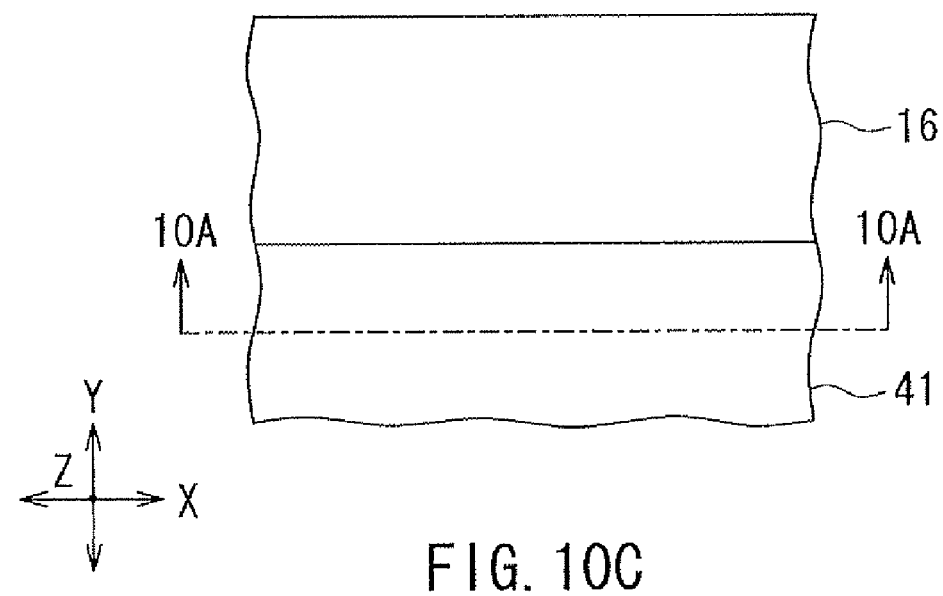

FIG. 10A to FIG. 10C show the next step. In this step, first, the lower shield 41 is formed on the insulating layer 15 by frame plating, for example. Next, the nonmagnetic layer 16 is formed over the entire top surface of the stack. The nonmagnetic layer 16 is then polished by, for example, CMP, until the lower shield 41 is exposed. The lower shield 41 and the nonmagnetic layer 16 are thereby flattened at the top.

Figure 11A:
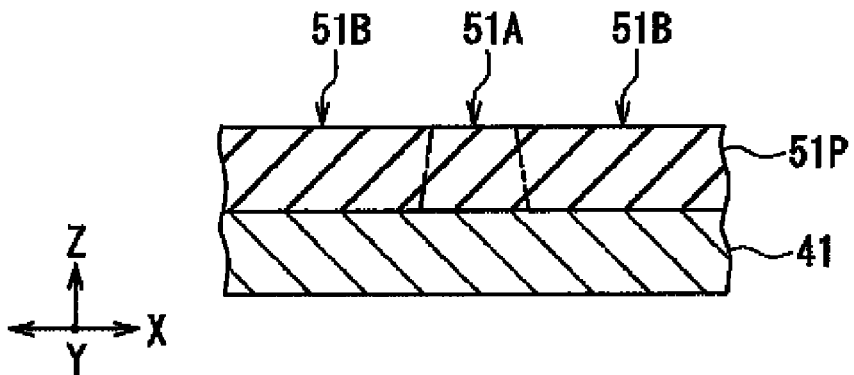
FIG. 11A to FIG. 11C are explanatory diagrams showing a step that follows the step shown in FIG. 10A to FIG. 10C.
Figure 11B:
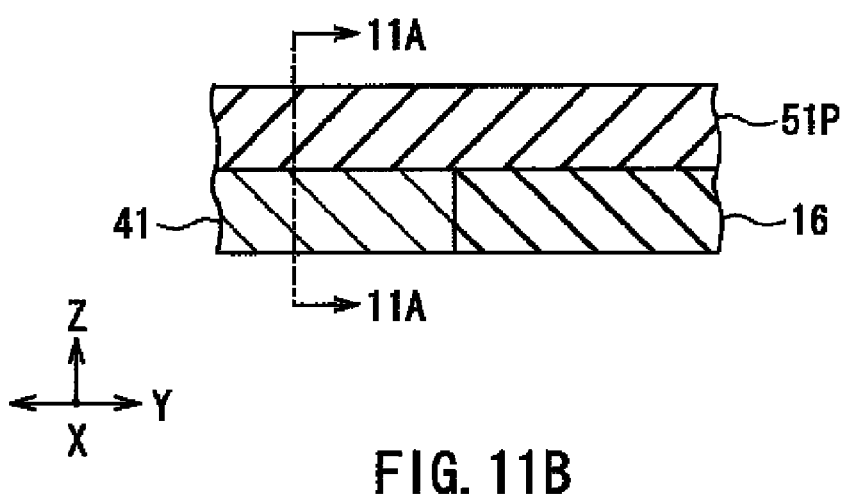
Figure 11C:
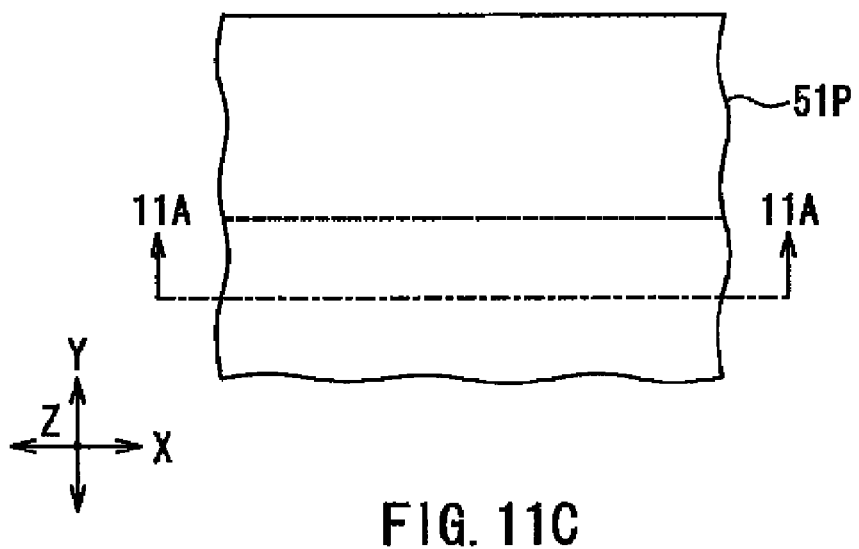

FIG. 11A to FIG. 11C show the next step. In this step, an initial lower gap layer 51P is formed over the lower shield 41 and the nonmagnetic layer 16. The initial lower gap layer 51P is made of the material intended for forming the lower gap 51. As shown in FIG. 11A, the initial lower gap layer 51P includes: a pre-lower-gap portion 51A that is intended to later become the lower gap 51; and two to-be-removed portions 51B that are located on opposite sides of the pre-lower-gap portion 51A in the track width direction and intended to be removed later. In FIG. 11A, the boundaries between the pre-lower-gap portion 51A and the to-be-removed portions 51B are shown by chain double-dashed lines.

Figure 12A:
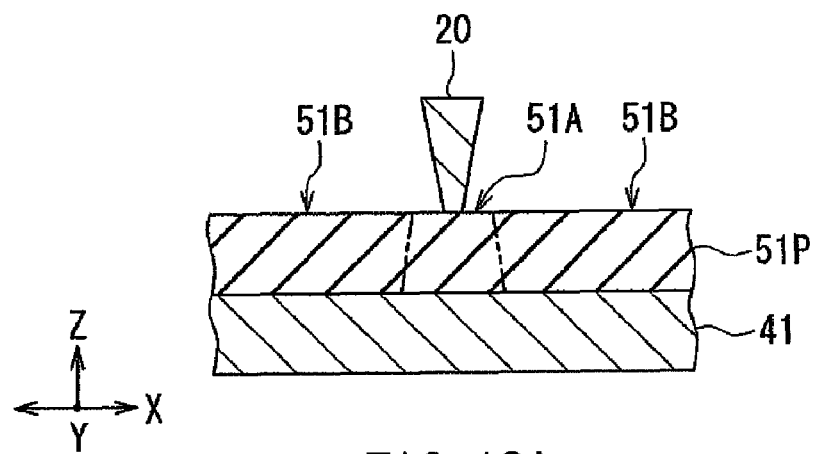
FIG. 12A to FIG. 12C are explanatory diagrams showing a step that follows the step shown in FIG. 11A to FIG. 11C.
Figure 12B:
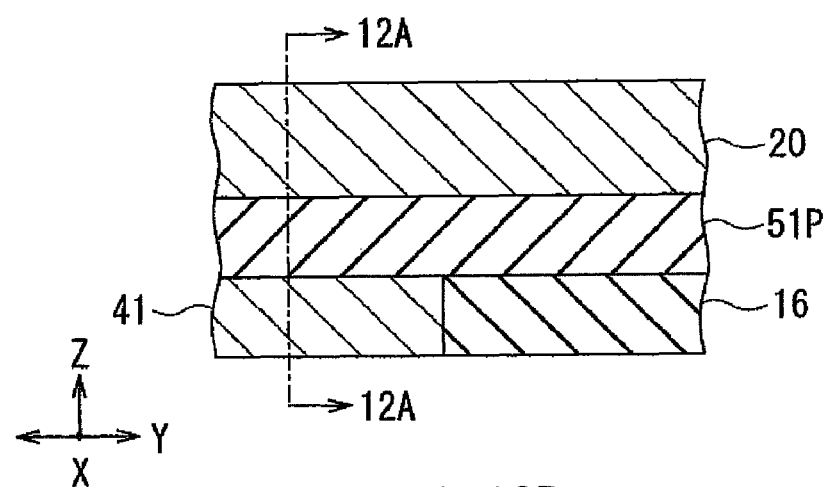
Figure 12C:
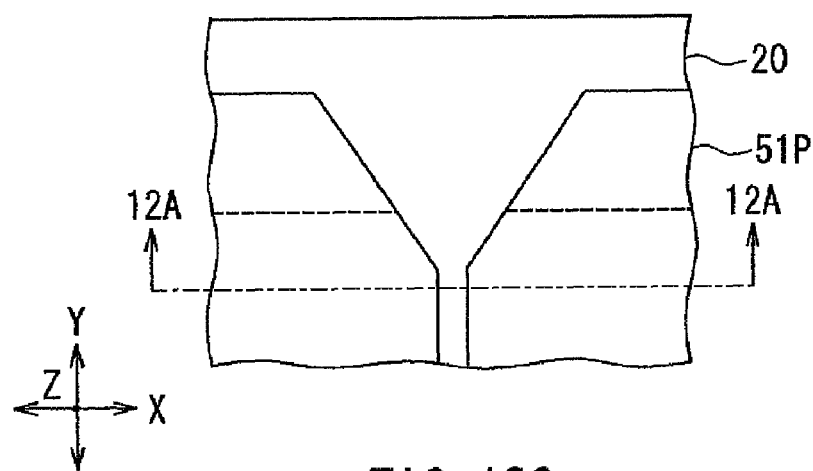

FIG. 12A to FIG. 12C show the next step. In this step, the main magnetic pole 20 is formed on the pre-lower-gap portion 51A of the initial lower gap layer 51P. The method of forming the main magnetic pole 20 is not specifically limited. For example, the main magnetic pole 20 may be formed by frame plating, or by forming a magnetic layer and then patterning the magnetic layer by etching.

Figure 13A:
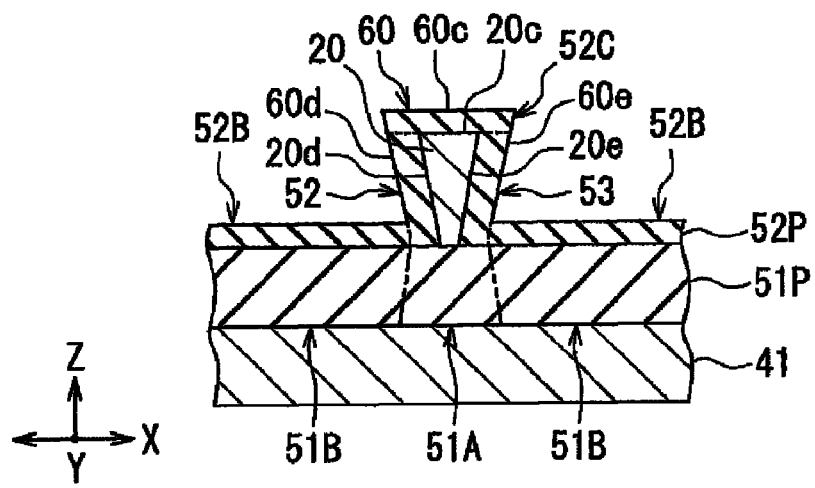
FIG. 13A to FIG. 13C are explanatory diagrams showing a step that follows the step shown in FIG. 12A to FIG. 12C.
Figure 13B:
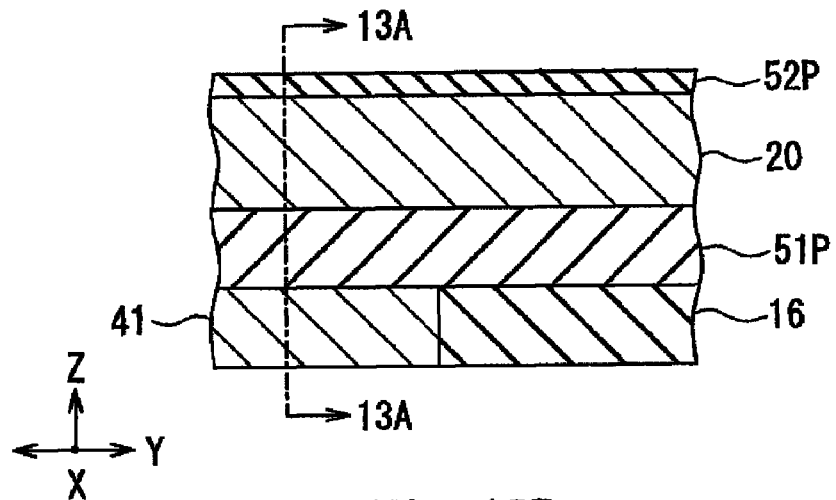
Figure 13C:
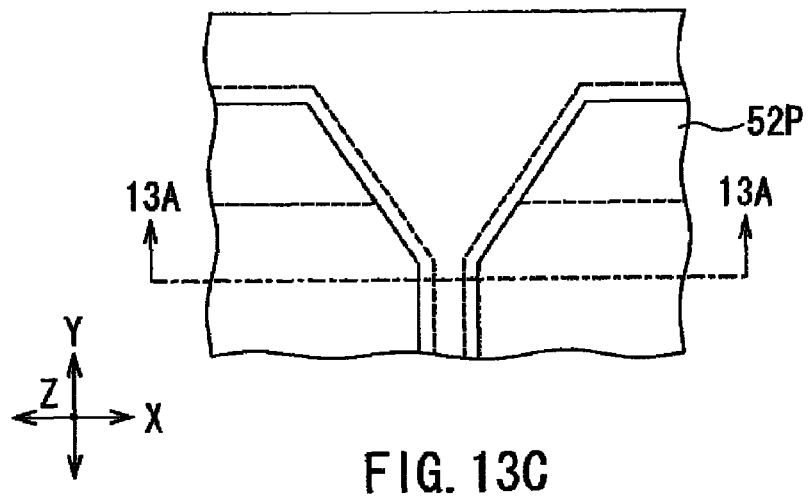

FIG. 13A to FIG. 13C show the next step. In this step, the side gaps 52 and 53 are formed on the side surfaces 20d and 20e of the main magnetic pole 20 so that a protrusion 60 is produced on the pre-lower-gap portion 51A, the protrusion 60 including the main magnetic pole 20 and the side gaps 52 and 53 and protruding upward from the top surface of the initial lower gap layer 51P. The protrusion 60 has a top surface 60c, and two opposite side surfaces 60d and 60e in the track width direction. To be more specific, in this step, an initial side gap layer 52P that is made of the material intended for forming the side gaps 52 and 53 is formed to cover the main magnetic pole 20 and the initial lower gap layer 51P. The initial side gap layer 52P includes the side gaps 52 and 53 and two unnecessary portions 52B. The two unnecessary portions 52B are located on the two to-be-removed portions 51B of the initial lower gap layer 51P and intended to be removed later. The initial side gap layer 52P further includes an unnecessary portion 52C that lies over the top surfaces of the side gaps 52 and 53 and the top surface 20c of the main magnetic pole 20 and is intended to be removed later. In FIG. 13A, the boundaries between the side gap 52 and the unnecessary portions 52B and 52C and the boundaries between the side gap 53 and the unnecessary portions 52B and 52C are shown by broken lines. The top surface 60c of the protrusion 60 is formed by the top surface of the unnecessary portion 52C. The side surfaces 60d and 60e of the protrusion 60 are formed by the respective side surfaces of the side gaps 52 and 53.

Figure 14A:
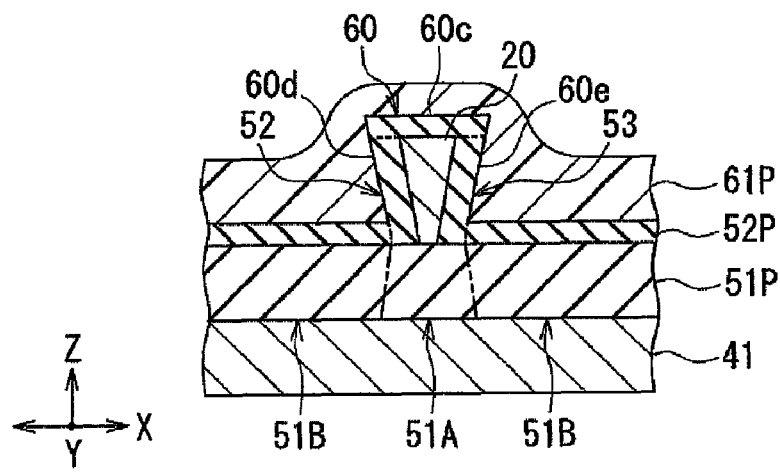
FIG. 14A to FIG. 14C are explanatory diagrams showing a step that follows the step shown in FIG. 13A to FIG. 13C.
Figure 14B:
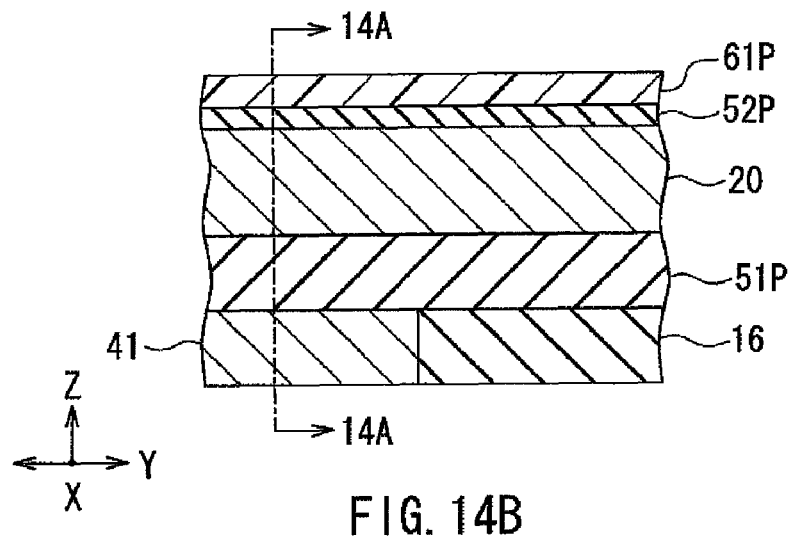
Figure 14C:
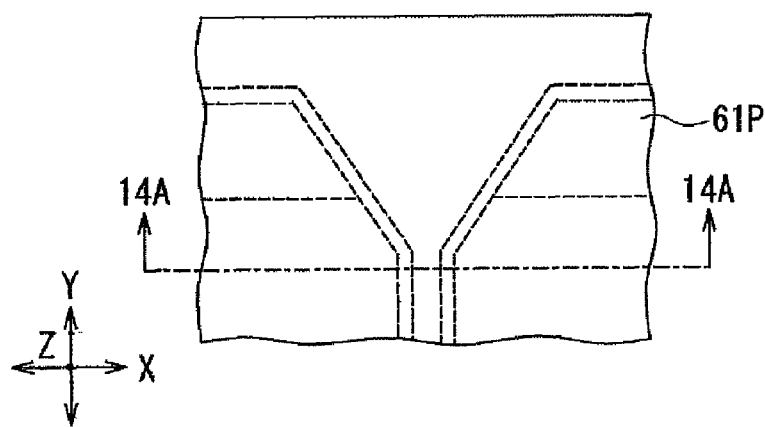

FIG. 14A to FIG. 14C show the next step. In this step, an initial resin layer 61P is formed to cover the top surface 60c and the side surfaces 60d and 60e of the protrusion 60. The initial resin layer 61P is made of a resin that is developer-soluble and non-photosensitive. For example, polymethyl glutarimide (PMGI) may be used as the resin for forming the initial resin layer 61P.

Figure 15A:
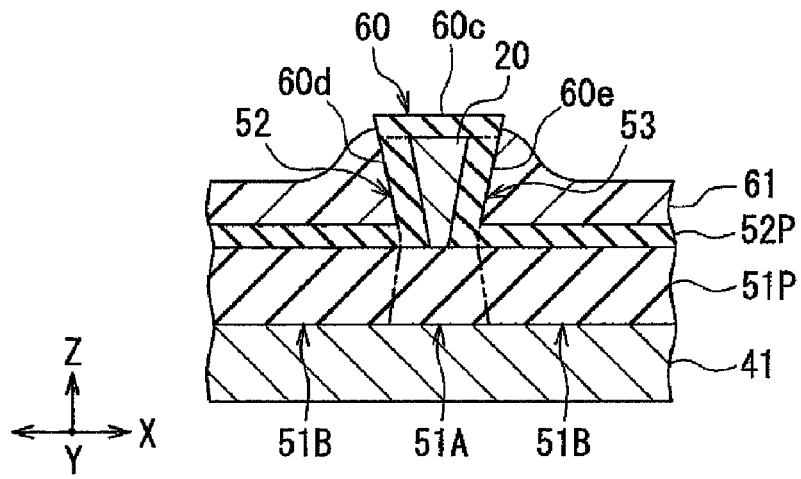
FIG. 15A to FIG. 15C are explanatory diagrams showing a step that follows the step shown in FIG. 14A to FIG. 14C.
Figure 15B:
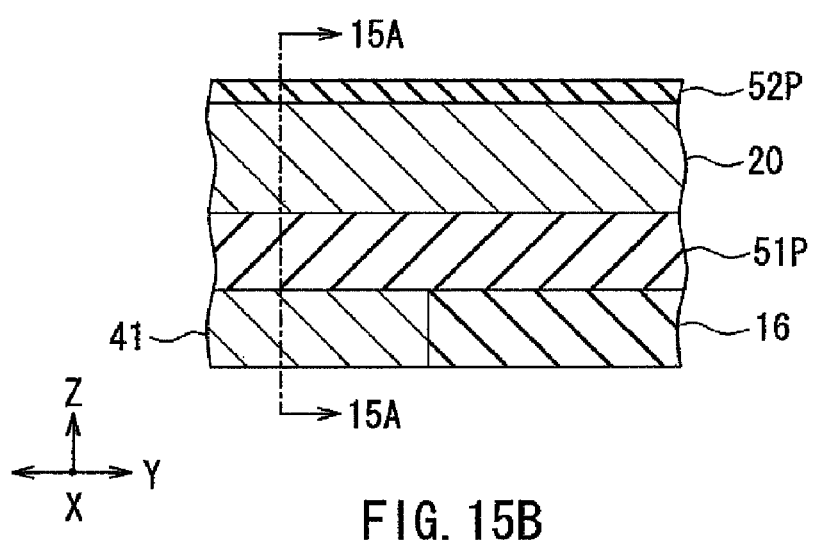
Figure 15C:
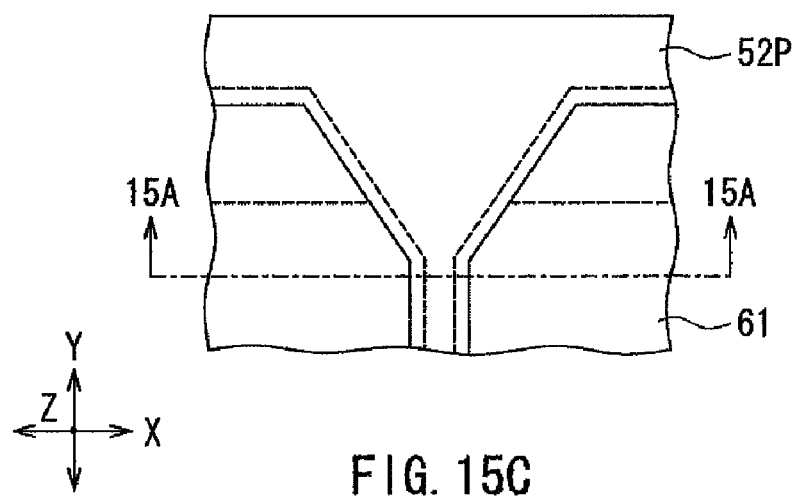

FIG. 15A to FIG. 15C show the next step. In this step, the initial resin layer 61P is partially removed so that the top surface 60c of the protrusion 60 is exposed. Examples of the method for partially removing the initial resin layer 61P include aching and dissolution using a developer. The partial removal of the initial resin layer 61P makes the initial resin layer 61P into a resin layer 61. The resin layer 61 does not lie on the top surface 60c of the protrusion 60, but lies on opposite sides of the protrusion 60 in the track width direction, being in contact with the side surfaces 60d and 60e of the protrusion 60. The resin layer 61 is developer-soluble and non-photosensitive. The top surface of the resin layer 61 has the maximum height in the portions adjoining the side gaps 52 and 53. The maximum height of the top surface of the resin layer 61 is at the same level as or lower than the top surface 60c of the protrusion 60. FIG. 15A shows the example where the maximum height of the top surface of the resin layer 61 is lower than the top surface 60c of the protrusion 60.

Figure 16A:
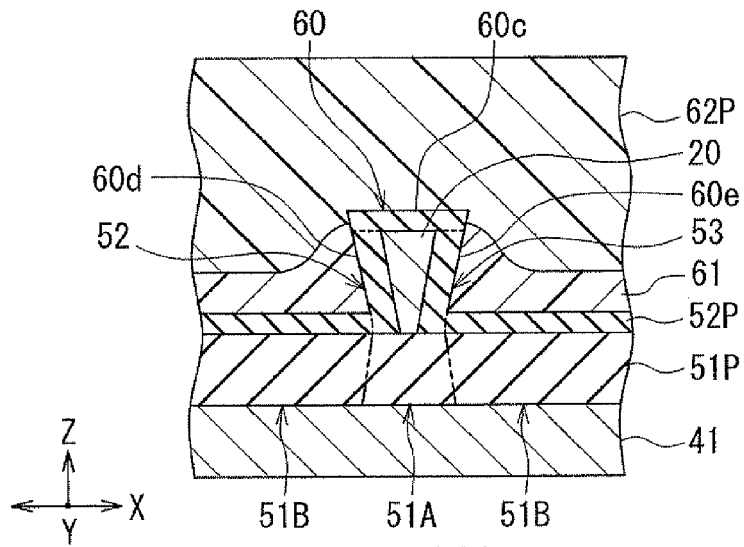
FIG. 16A to FIG. 16C are explanatory diagrams showing a step that follows the step shown in FIG. 15A to FIG. 15C.
Figure 16B:
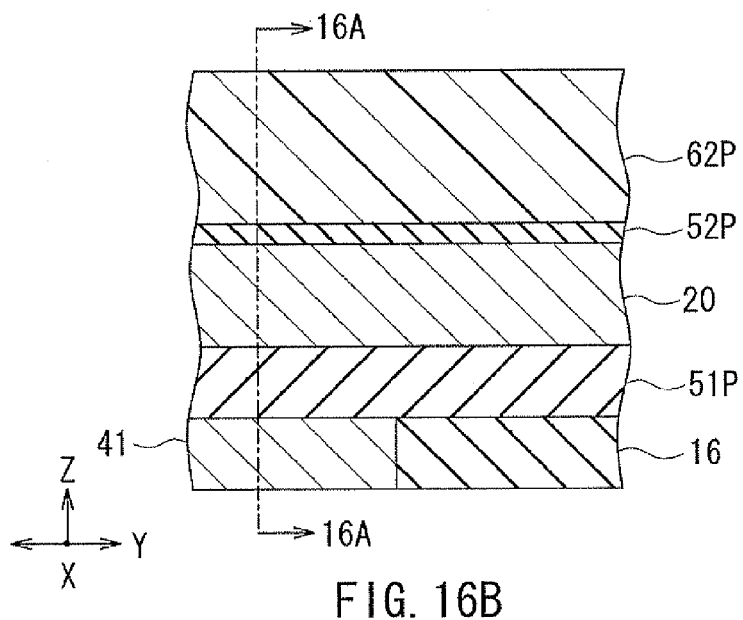
Figure 16C:
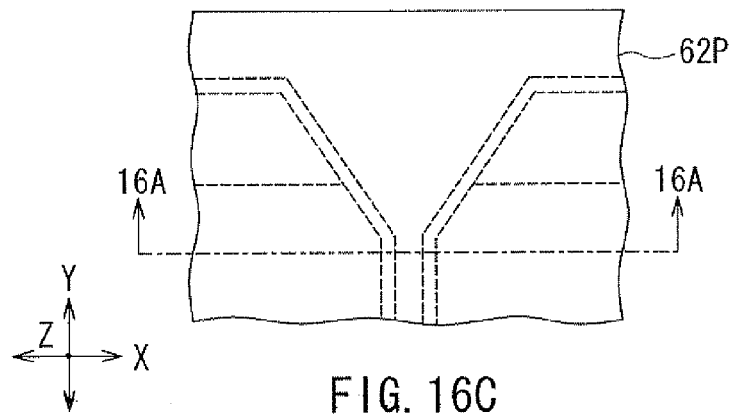

FIG. 16A to FIG. 16C show the next step. In this step, a photoresist layer 62P is formed to cover the resin layer 61 and the protrusion 60.

Figure 17A:
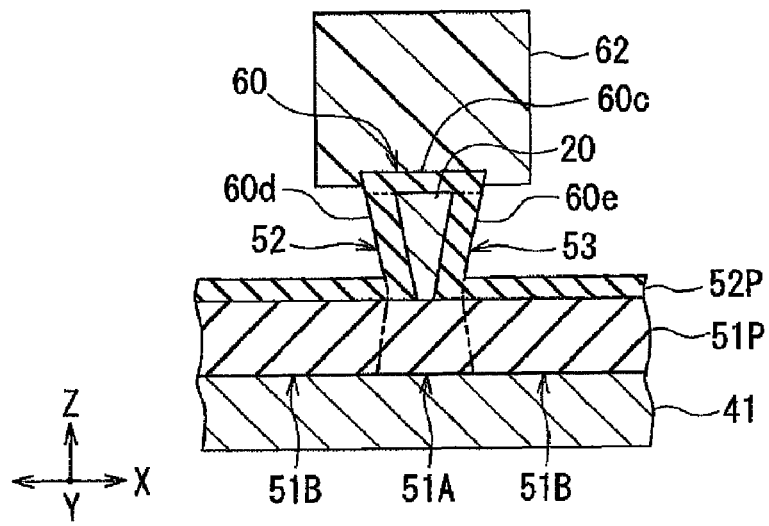
FIG. 17A to FIG. 17C are explanatory diagrams showing a step that follows the step shown in FIG. 16A to FIG. 16C.
Figure 17B:
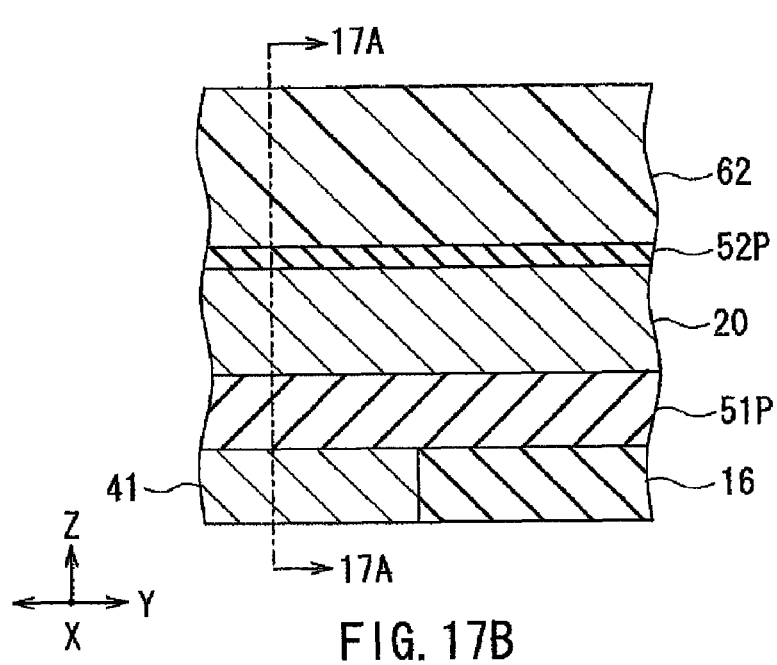
Figure 17C:
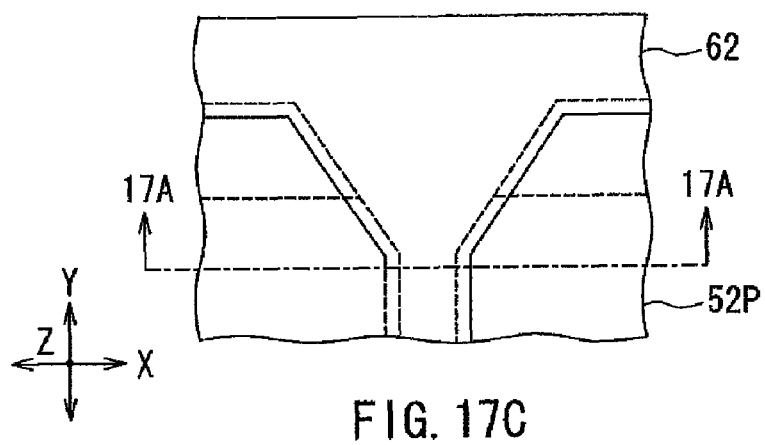

FIG. 17A to FIG. 17C show the next step. In this step, the photoresist layer 62P is patterned by photolithography including exposure and development, whereby a mask 62 covering the top surface 60c of the protrusion 60 is formed and the resin layer 61 is removed by dissolution in the developer used in the development. The width of the mask 62 in the track width direction is equal to or greater than the width of the top surface 60c of the protrusion 60 in the track width direction. The distance between an end of the mask 62 in the track width direction and the nearest end of the top surface 60c is 0.1 μm or less, for example. If the maximum height of the top surface of the resin layer 61 is lower than the top surface 60c of the protrusion 60 as shown in FIG. 15A and the width of the mask 62 is greater than that of the top surface 60c of the protrusion 60 as shown in FIG. 17A, the mask 62 covers the top surface 60c of the protrusion 60 and respective portions of the side surfaces 60d and 60e of the protrusion 60 that are continuous with the top surface 60c. In such a case, the positions of the lower ends of the portions of the mask 62 covering the respective portions of the side surfaces 60d and 60e of the protrusion 60 are determined by the upper ends of the portions of the resin layer 61 adjoining the side gaps 52 and 53 shown in FIG. 15A.

Figure 18A:
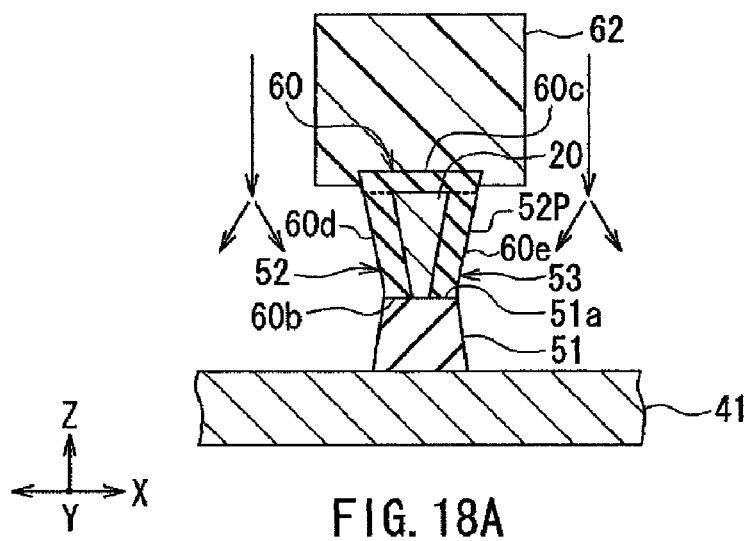
FIG. 18A to FIG. 18C are explanatory diagrams showing a step that follows the step shown in FIG. 17A to FIG. 17C.
Figure 18B:
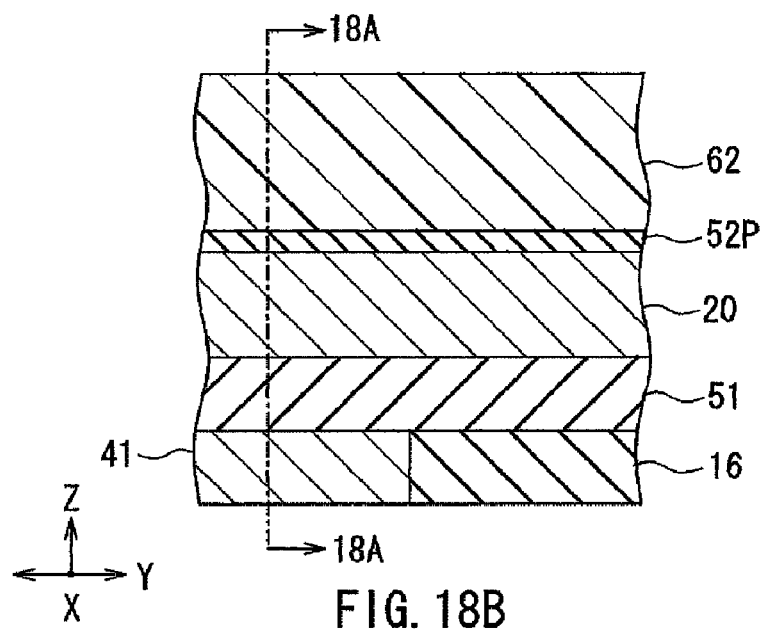
Figure 18C:
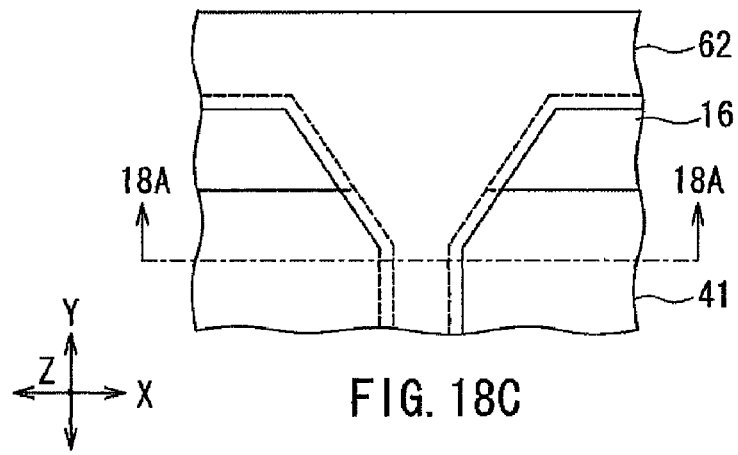

FIG. 18A to FIG. 18C show the next step. In this step, the initial lower gap layer 51P is etched in part with the top surface 80c of the protrusion 60 covered with the mask 62, so that the two to-be-removed portions 51B of the initial lower gap layer 51P are removed and the pre-lower-gap portion 51A becomes the lower gap 51. Hereinafter, this step will be referred to as the etching step. In the position where the medium facing surface 30 is to be formed later, as shown in FIG. 18A, the positions of opposite ends of the top surface 51a of the lower gap 51 in the track width direction coincide with the positions of opposite ends of the bottom surface 60b of the protrusion 60 in the track width direction after the etching step. After the etching step, the width of the bottom surface 60b of the protrusion 60 in the track width direction is smaller than the width of the top surface 60c of the protrusion 60 in the track width direction. The etching step is performed by reactive ion etching (hereinafter referred to as RIE) or ion milling, for example. The arrows in FIG. 18A indicate ion beams.

Figure 19A:
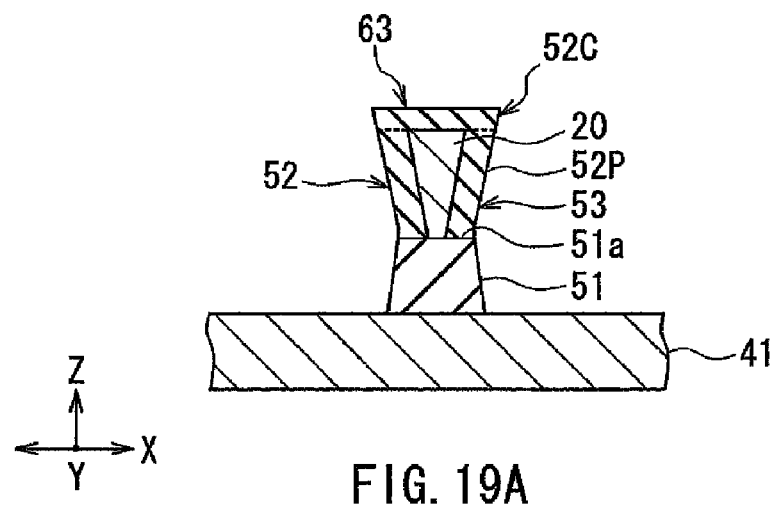
FIG. 19A to FIG. 19C are explanatory diagrams showing a step that follows the step shown in FIG. 18A to FIG. 18C.
Figure 19B:
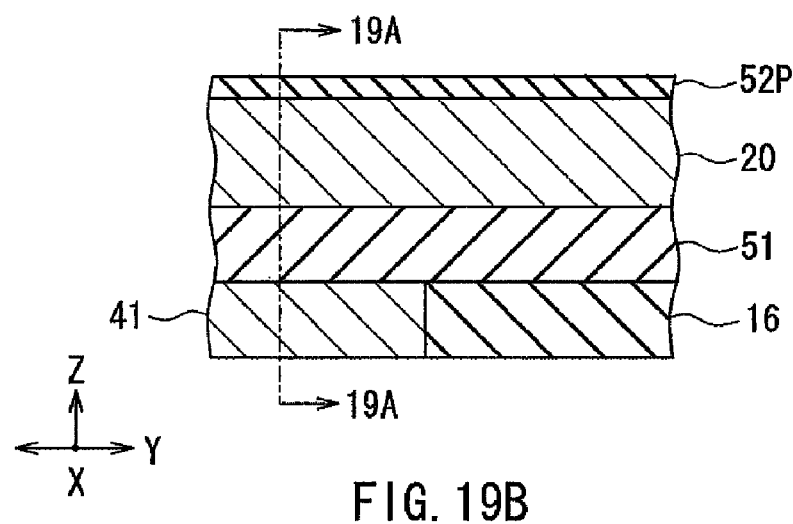
Figure 19C:
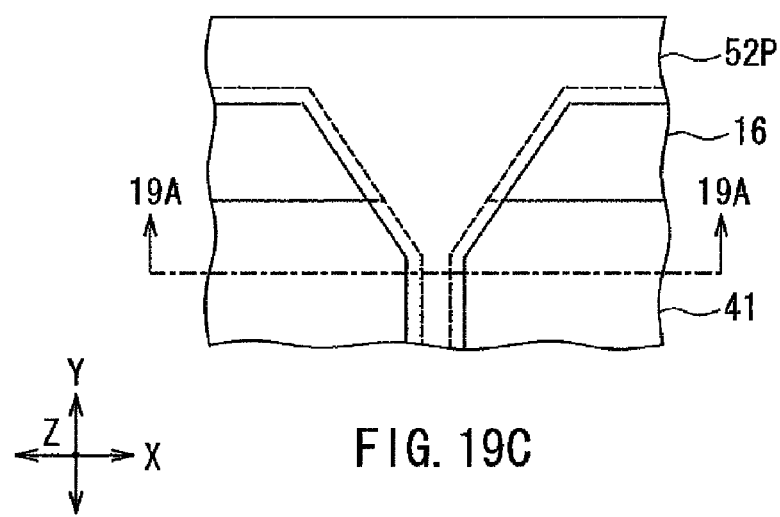

FIG. 19A to FIG. 19C show the next step. In this step, the mask 62 is removed. This forms a structure 63 on top of the lower shield 41 and the nonmagnetic layer 16. The structure 63 includes the lower gap 51, the main magnetic pole 20 and the side gaps 52 and 53. The process from the step shown in FIG. 11A to FIG. 11C to the step shown in FIG. 19A to FIG. 19C corresponds to the step of forming the structure according to the present invention.

Figure 20A:
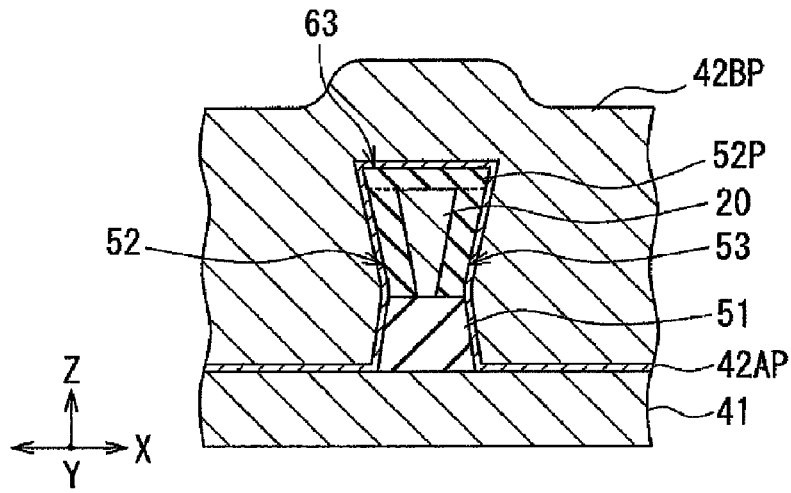
FIG. 20A to FIG. 20C are explanatory diagrams showing a step that follows the step shown in FIG. 19A to FIG. 19C.
Figure 20B:
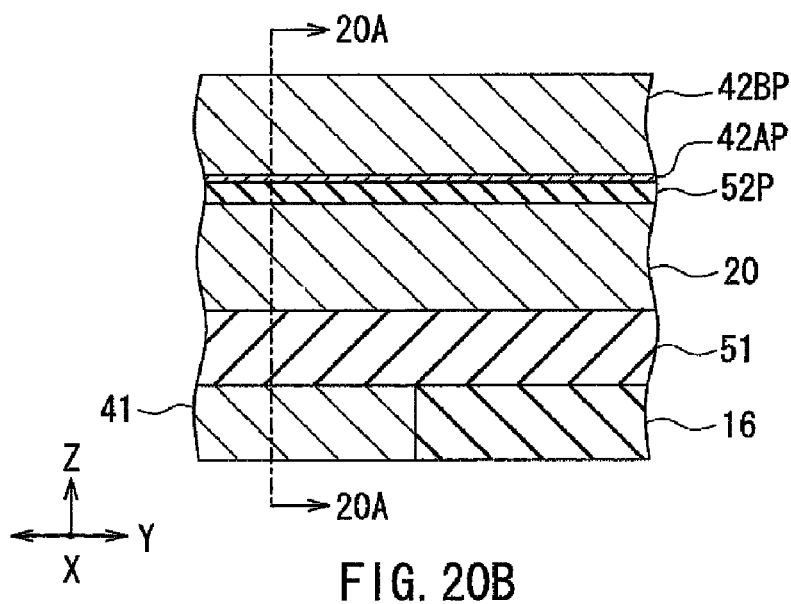
Figure 20C:
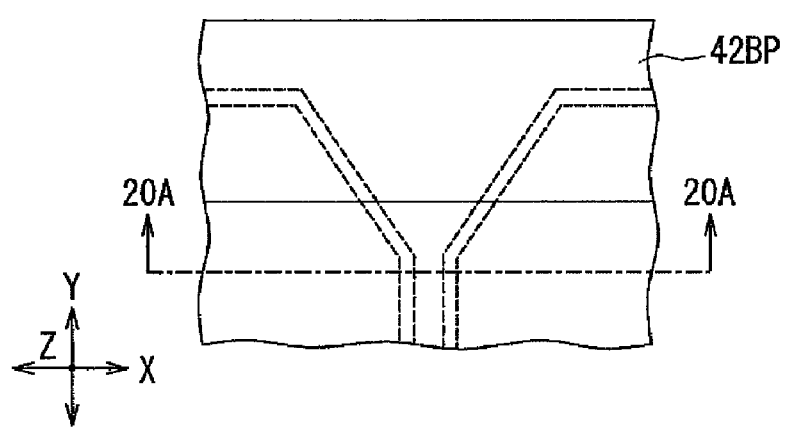

FIG. 20A to FIG. 20C show the next step. In this step, first, an electrode film 42AP that functions as an electrode and seed layer for plating is formed to cover the entire structure 63 and the top surfaces of the lower shield 41 and the nonmagnetic layer 16. Next, a not-shown frame for forming the side shields 42 and 43 is formed on the electrode film 42AP. The frame has openings in the areas where to form the side shields 42 and 43. The frame is formed by patterning a photoresist layer by photolithography. Next, a plating layer 42BP made of a magnetic material is formed to fill the openings of the frame by frame plating, using the electrode film 42AP as the electrode and seed layer. The plating layer 42BP is used for forming the side shields 42 and 43. While the electrode film 42AP can be made of either of a magnetic material and a nonmagnetic material, the former is preferred. In the following description, assume that the electrode film 42AP is made of a magnetic material. In this case, the electrode film 42AP is used for forming respective portions of the side shields 42 and 43.

Figure 21A:
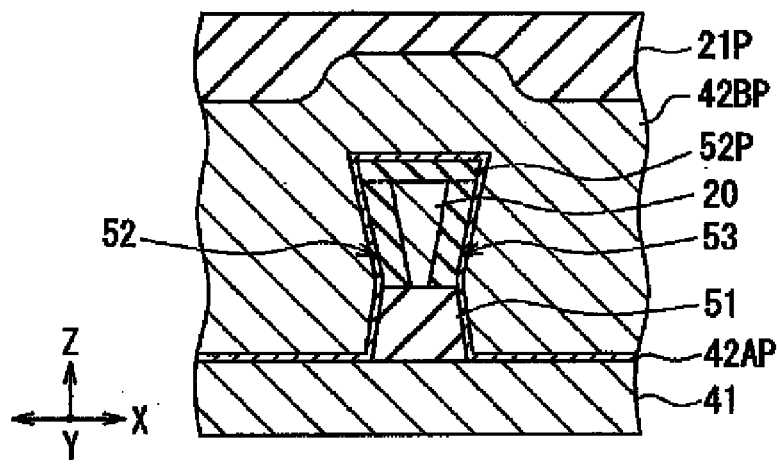
FIG. 21A to FIG. 21C are explanatory diagrams showing a step that follows the step shown in FIG. 20A to FIG. 20C.
Figure 21B:
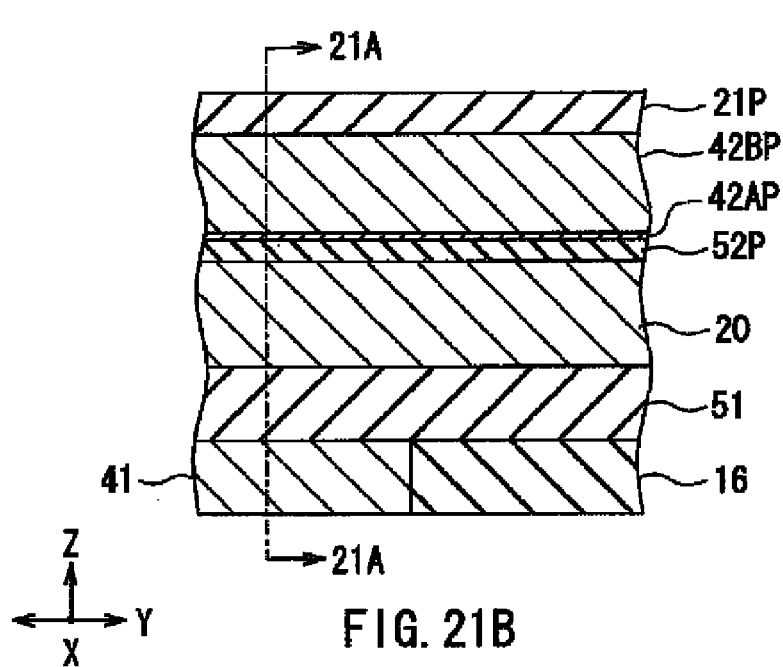
Figure 21C:
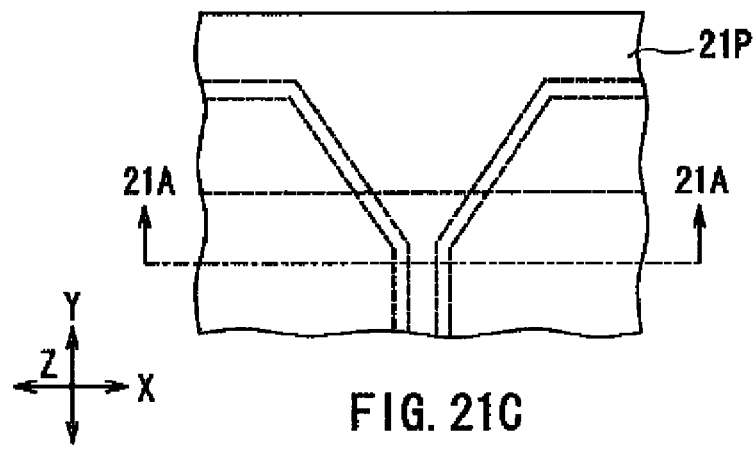

FIG. 21A to FIG. 21C show the next step. In this step, first, the frame is removed. Next, the electrode film 42AP except the portions thereof lying under the plating layer 42BP is removed. Next, a nonmagnetic film 21P that is to become the nonmagnetic layer 21 later is formed to cover the entire stack.

Figure 22A:
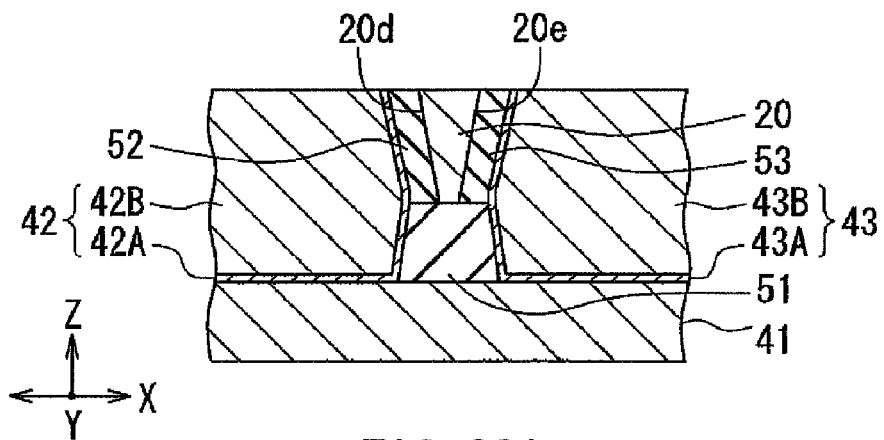
FIG. 22A to FIG. 22C are explanatory diagrams showing a step that follows the step shown in FIG. 21A to FIG. 21C.
Figure 22B:
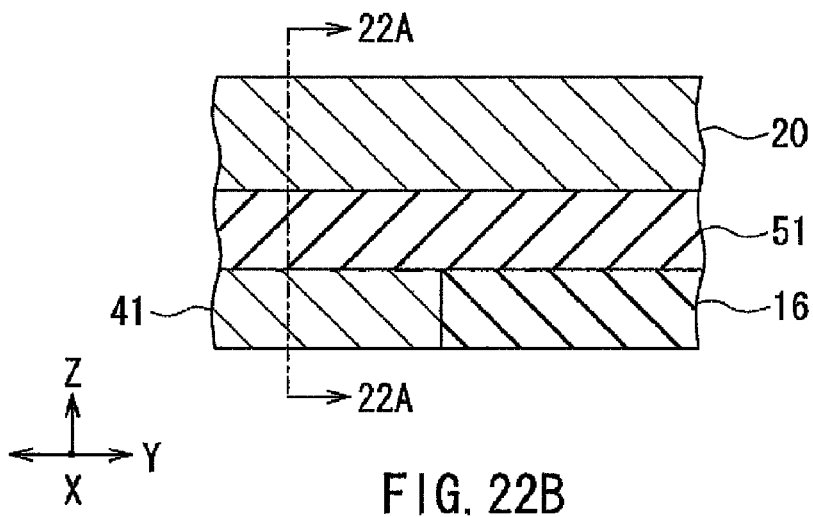
Figure 22C:
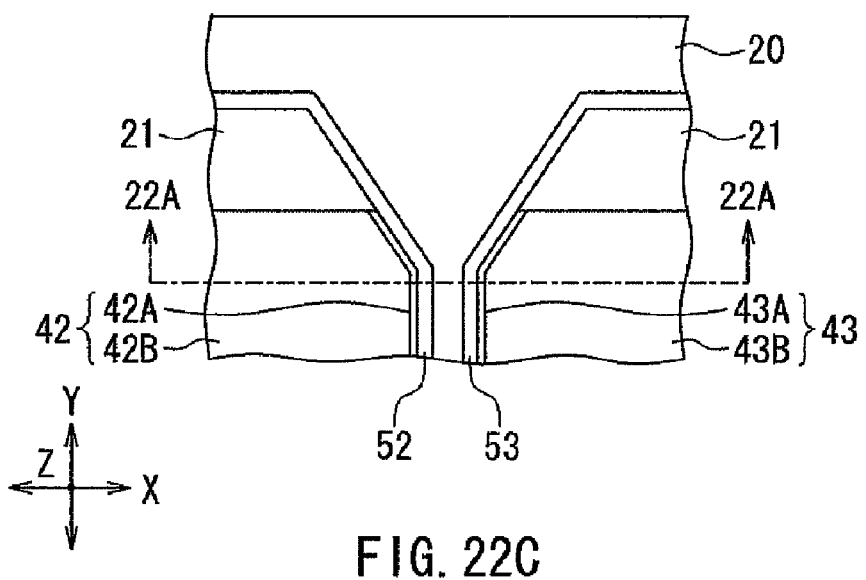

FIG. 22A to FIG. 22C show the next step. In this step, the nonmagnetic film 21P, the plating layer 42BP, the electrode film 42AP, and the initial side gap layer 52P are polished by, for example, CMP, until the top surface of the main magnetic pole 20 is exposed. This separates the initial side gap layer 52P, the electrode film 42AP, and the plating layer 42BP into respective two portions that are located on opposite sides of the main magnetic pole 20 in the track width direction. The initial side gap layer 52P is made into the side gap 52 and the side gap 53 that are in contact with the side surface 20d and the side surface 20e of the main magnetic pole 20, respectively. The side shields 42 and 43 are formed by the electrode film 42AP and the plating layer 42BP. The side shield 42 includes a first layer 42A and a second layer 42B. The side shield 43 includes a first layer 43A and a second layer 43B. The first layers 42A and 43A are formed by the two separated portions of the electrode film 42AP. The second layers 42B and 43B are formed by the two separated portions of the plating layer 42BP.

Figure 23A:
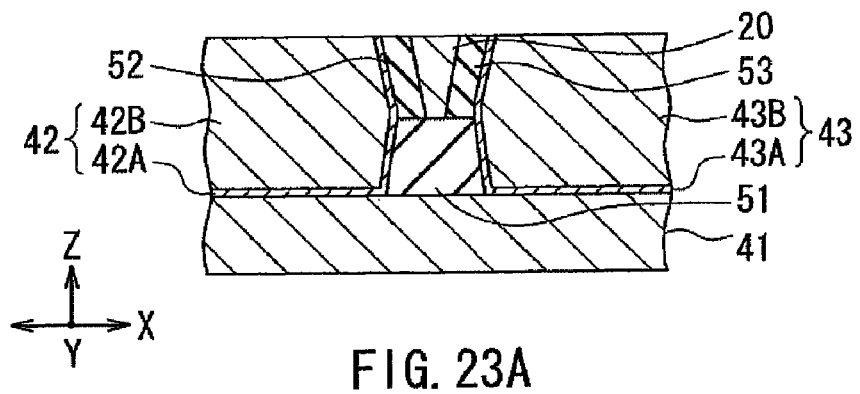
FIG. 23A to FIG. 23C are explanatory diagrams showing a step that follows the step shown in FIG. 22A to FIG. 22C.
Figure 23B:
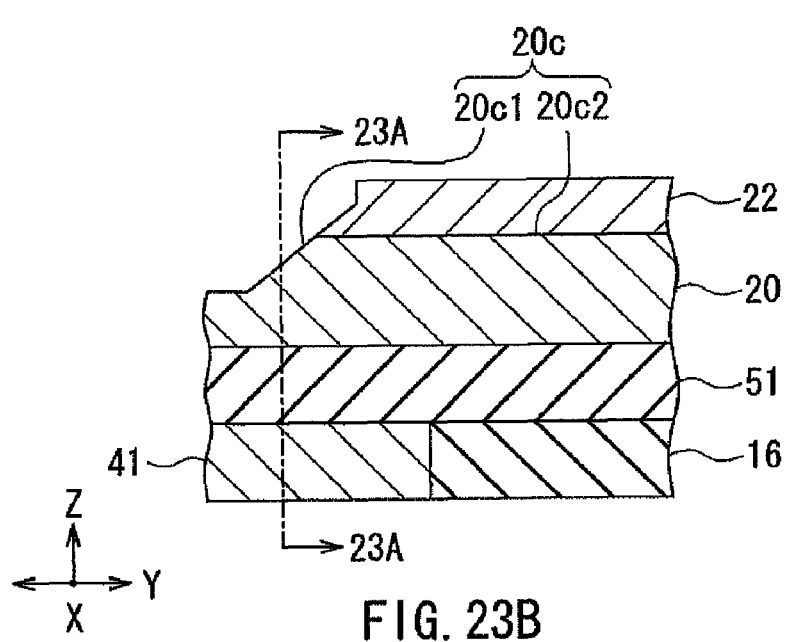
Figure 23C:
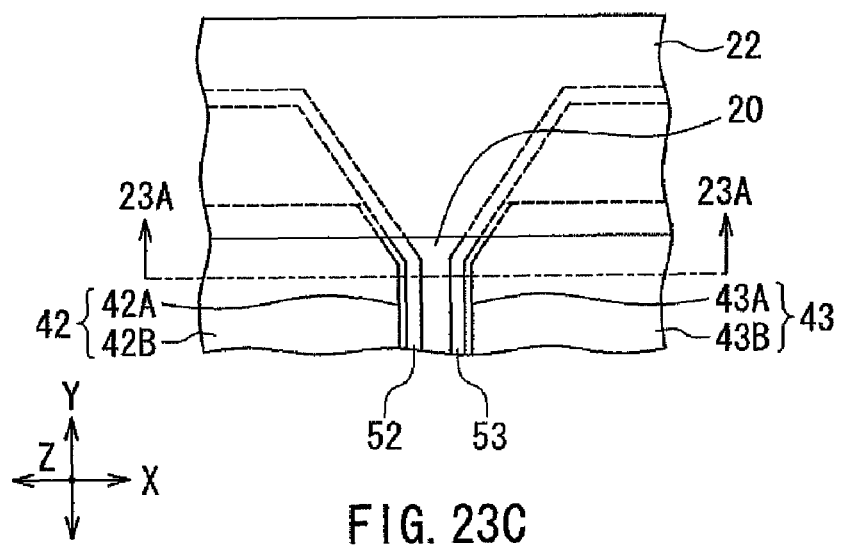

FIG. 23A to FIG. 23C show the next step. In this step, first, a to-be-etched layer (not shown) that is to become the nonmagnetic layer 22 later is formed by frame plating, for example. Next, a not-shown etching mask is formed on the to-be-etched layer. The etching mask covers a part of the top surface of the to-be-etched layer, the part being intended to become the top surface 22b of the nonmagnetic layer 22 later. The etching mask is formed by patterning a photoresist layer by photolithography. Next, the other part of the to-be-etched layer which is not covered with the etching mask and a part of the top surface of the main magnetic pole 20 are etched by ion milling, for example. This etching makes the to-be-etched layer into the nonmagnetic layer 22, as shown in FIG. 23B.

This etching also forms the first part 20c1 and the second part 20c2 of the top surface 20c of the main magnetic pole 20.

Figure 24A:
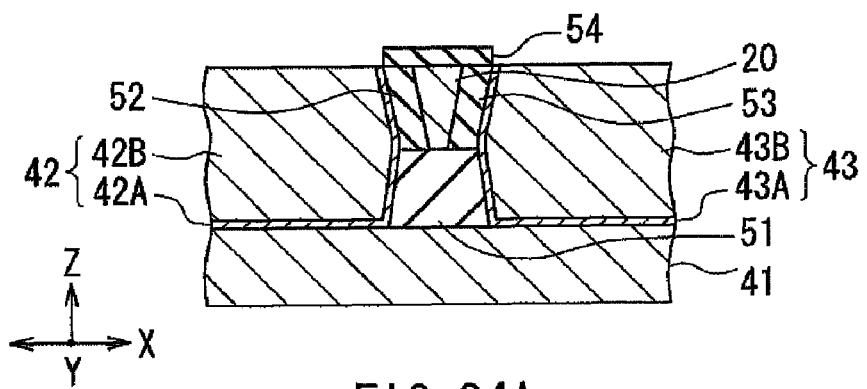
FIG. 24A to FIG. 24C are explanatory diagrams showing a step that follows the step shown in FIG. 23A to FIG. 23C.
Figure 24B:
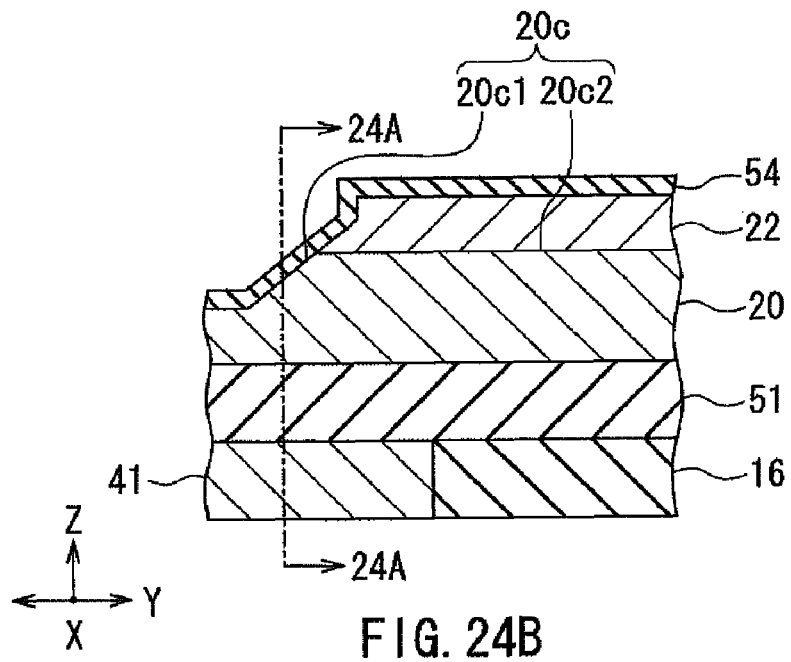
Figure 24C:
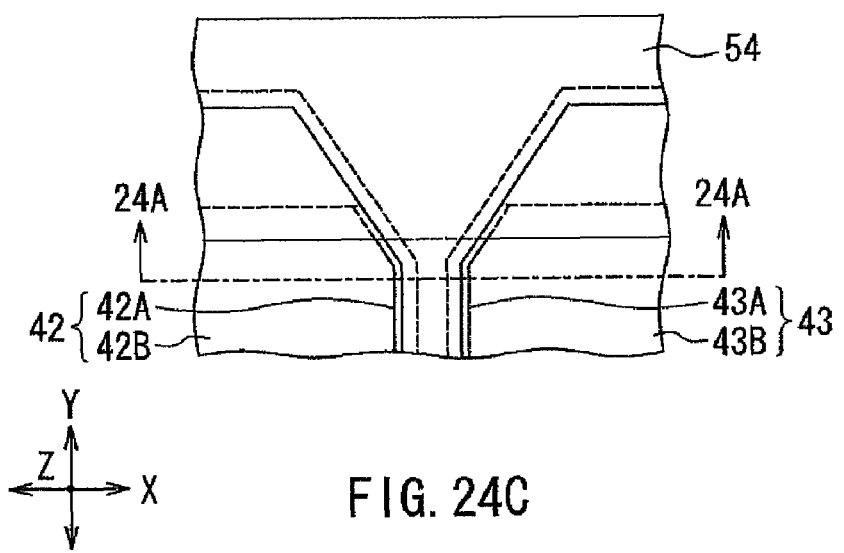

FIG. 24A to FIG. 24C show the next step. In this step, the upper gap 54 is formed to cover the top surfaces of the main magnetic pole 20 and the side gaps 52 and 53.

Figure 25A:
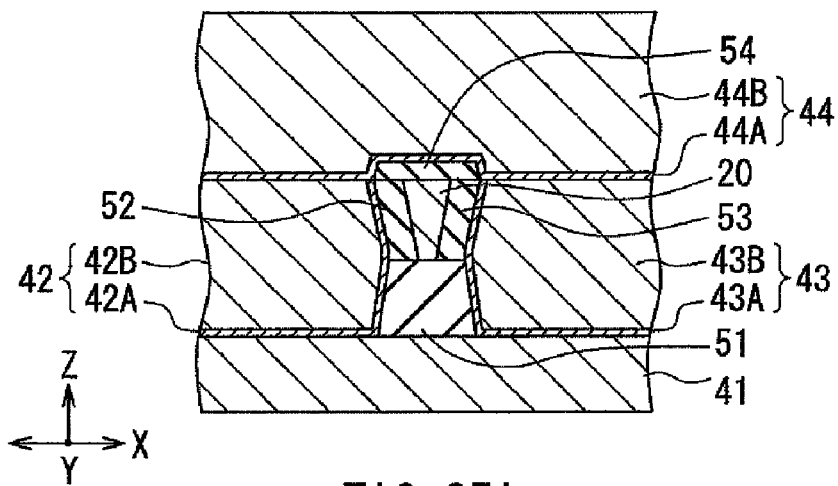
FIG. 25A to FIG. 25C are explanatory diagrams showing a step that follows the step shown in FIG. 24A to FIG. 24C.
Figure 25B:
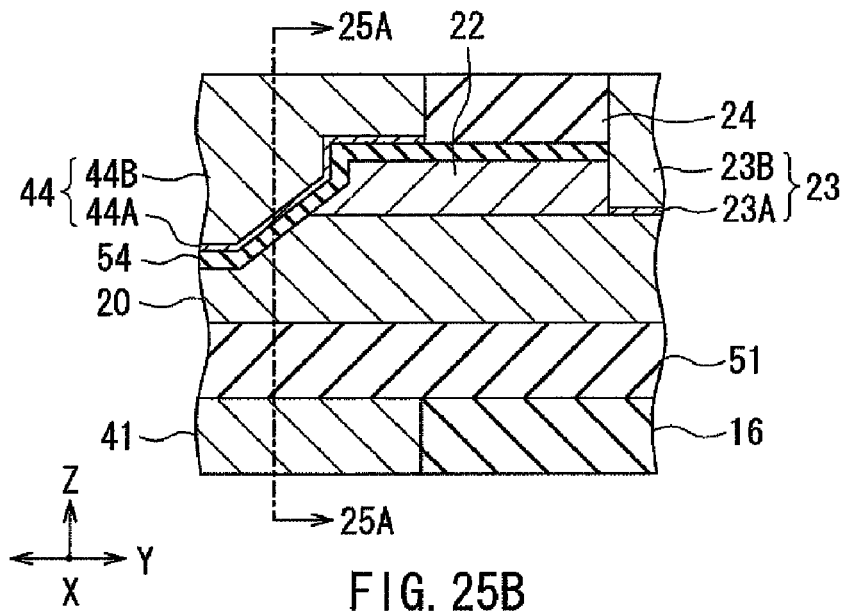
Figure 25C:
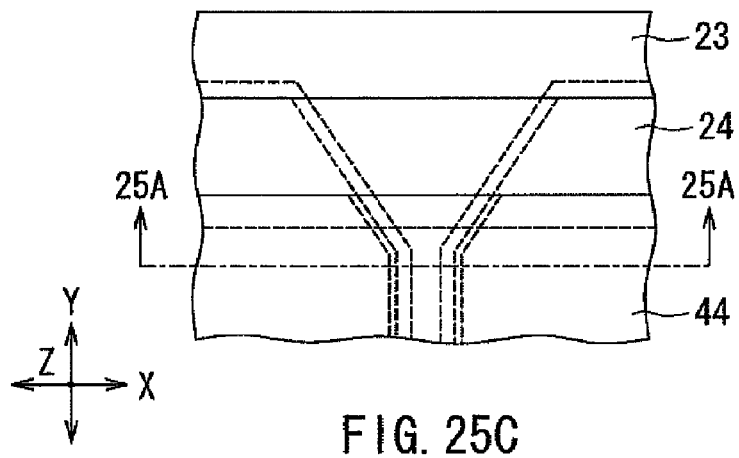

FIG. 25A to FIG. 25C show the next step. In this step, first, the nonmagnetic layer 22 and the upper gap 54 are each etched in part so as to expose a part of the top surface of the main magnetic pole 20 on which the yoke layer 23 is to be disposed. Next, an electrode film that functions as an electrode and seed layer for plating is formed to cover the top surface of the stack. Next, a not-shown frame for forming the upper shield 44 and the yoke layer 23 is formed on the electrode film. The frame has two openings in the areas where to form the upper shield 44 and the yoke layer 23, respectively. The frame is formed by patterning a photoresist layer by photolithography. Next, plating layers made of a magnetic material are formed in the two openings of the frame by frame plating, using the electrode film as the electrode and seed layer. The plating layers are used for forming the upper shield 44 and the yoke layer 23. While the electrode film can be made of either of a magnetic material and a nonmagnetic material, the former is preferred. Here, assume that the electrode film is made of a magnetic material. In this case, the electrode film is used for forming respective portions of the upper shield 44 and the yoke layer 23. Next, the frame is removed. Next, the electrode film except the portions thereof lying under the plating layers is removed by etching. Next, a nonmagnetic film that is to become the nonmagnetic layer 24 later is formed to cover the entire stack. The nonmagnetic film is then polished by, for example, CMP, until the top surfaces of the plating layers are exposed. This makes the nonmagnetic film into the nonmagnetic layer 24. Also, the upper shield 44 and the yoke layer 23 are formed by the remaining electrode films and the plating layers. The upper shield 44 includes a first layer 44A and a second layer 44B. The yoke layer 23 includes a first layer 23A and a second layer 23B. The first layers 44A and 23A are formed by the remaining electrode films. The second layers 44B and 23B are formed by the plating layers.

Next, as shown in FIG. 4, the insulating layer 25 is formed over areas of the top surfaces of the yoke layer 23 and the nonmagnetic layer 24 above which the coil 26 is to be disposed. The coil 26 is then formed by, for example, frame plating, such that at least a part of the coil 26 lies on the insulating layer 25. Next, the insulating layer 27 is formed to cover the coil 26. Next, the return yoke layer 28 is formed by frame plating, for example. Next, the protection layer 29 is formed to cover the entire top surface of the stack. Wiring, terminals, and other components are then formed on the protection layer 29. The substrate 1 is then cut near the position where the medium facing surface 30 is to be formed, and the cut surface is polished into the medium facing surface 30. Flying rails and other components are formed further to complete the magnetic head.

Figure 26:
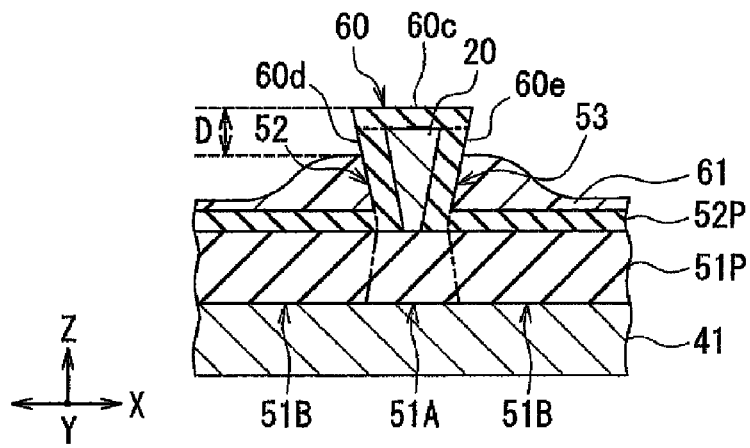
FIG. 26 is an explanatory diagram showing a modification example of the step shown in FIG. 15A.

A modification example of the steps shown in FIG. 15A, FIG. 16A and FIG. 17A will now be described with reference to FIG. 26 to FIG. 28. The step shown in FIG. 26 is basically the same as that shown in FIG. 15A. Note that the maximum height of the top surface of the resin layer 61 in FIG. 26 is lower than that in the example shown in FIG. 15A. As shown in FIG. 26, the difference in height between the highest portion of the top surface of the resin layer 61 and the top surface 60c of the protrusion 60 will be designated by the symbol D. In the present embodiment, the difference in height D is adjustable by the amount of removal of the initial resin layer 61P in the step that has been described with reference to FIG. 15A to FIG. 15C.

Figure 27:
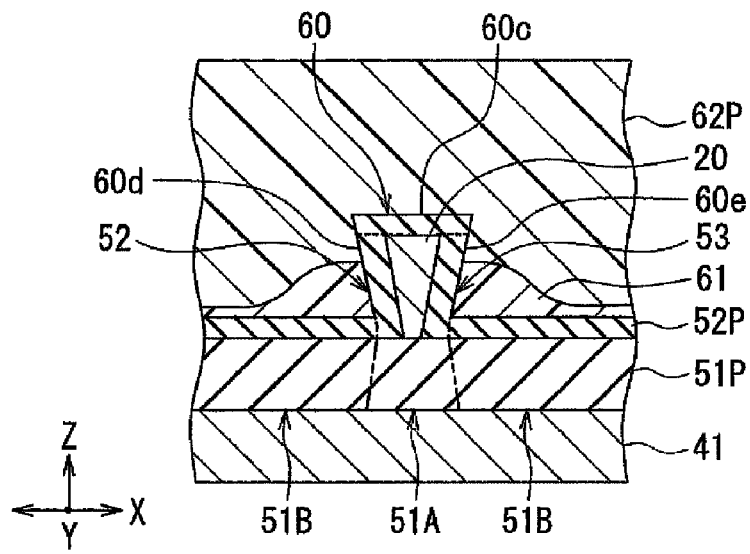
FIG. 27 is an explanatory diagram showing a step that follows the step shown in FIG. 26.
Figure 28:
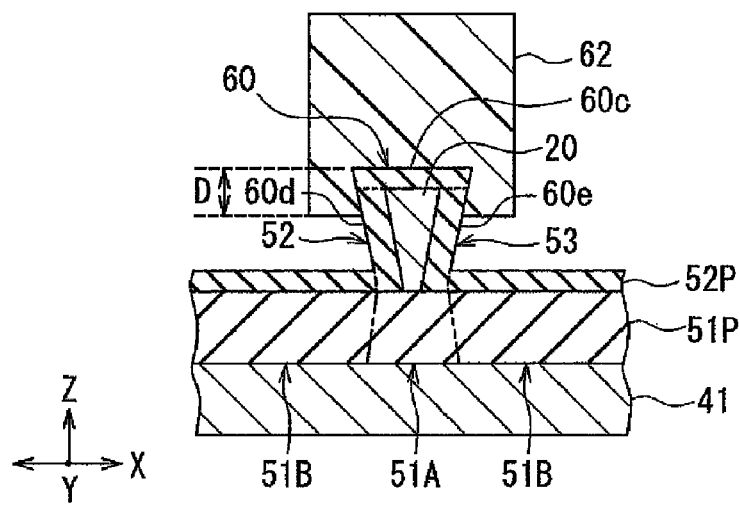
FIG. 28 is an explanatory diagram showing a step that follows the step shown in FIG. 27.

FIG. 27 shows a step that follows the step shown in FIG. 26. FIG. 28 shows a step that follows the step shown in FIG. 27. The step shown in FIG. 27 is basically the same as that shown in FIG. 16A. The step shown in FIG. 28 is basically the same as that shown in FIG. 17A. Note that in FIG. 28, the lower ends of the portions of the mask 62 covering the respective portions of the side surfaces 60d and 60e of the protrusion 60 are positioned lower than in the example shown in FIG. 17A. The difference in height between these lower ends and the top surface 60c of the protrusion 60 is almost the same as the difference in height D shown in FIG. 26. In the present embodiment, the positions of the lower ends of the portions of the mask 62 covering the respective portions of the side surfaces 60d and 60e of the protrusion 60 are therefore adjustable by the amount of removal of the initial resin layer 61P in the step that has been described with reference to FIG. 15A to FIG. 15C. The effect provided by this will be detailed later.

Next, the effect of the manufacturing method for a magnetic head according to the present embodiment will be described in comparison with a manufacturing method for a magnetic head of a comparative example. Initially, the manufacturing method for a magnetic head of the comparative example will be described with reference to FIG. 29 to FIG. 37. FIG. 29 to FIG. 37 each show a cross section of a stack of layers in the process of manufacturing the magnetic head, taken at the position where the medium facing surface is to be formed later. Note that the portions below the lower shield 41 and the nonmagnetic layer 16 are omitted in FIG. 29 to FIG. 37.

Figure 29:
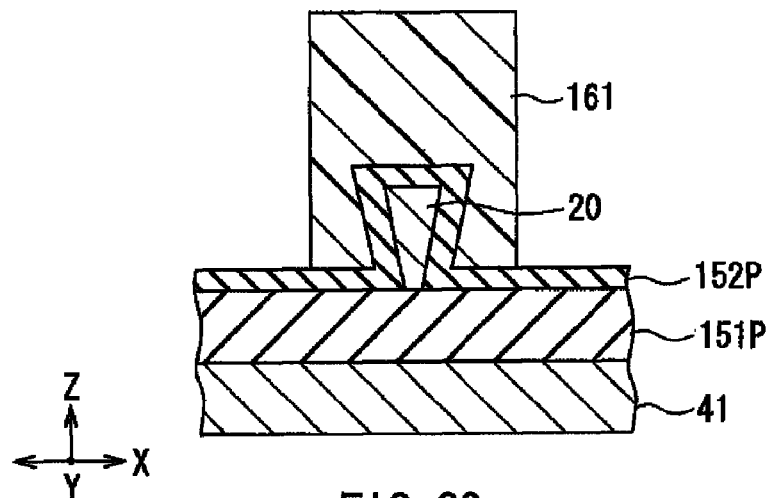
FIG. 29 is an explanatory diagram showing a step of a manufacturing method for a magnetic head of a comparative example.

The steps of the manufacturing method for a magnetic head of the comparative example are the same as those of the present embodiment up to the step of FIG. 13A to FIG. 13C. FIG. 29 shows the next step. In the comparative example, as shown in FIG. 29, an initial lower gap layer 151P and an initial side gap layer 152P are formed instead of the initial lower gap layer 51P and the initial side gap layer 52P of FIG. 13A, respectively. The shapes and materials of the initial lower gap layer 151P and the initial side gap layer 152P are the same as those of the initial lower gap layer 51P and the initial side gap layer 52P.

In the step shown in FIG. 29, a mask 161 is formed to cover the entire main magnetic pole 20 and a part of the initial side gap layer 152P. The mask 161 is formed by patterning a photoresist layer by photolithography, for example.

Figure 30:
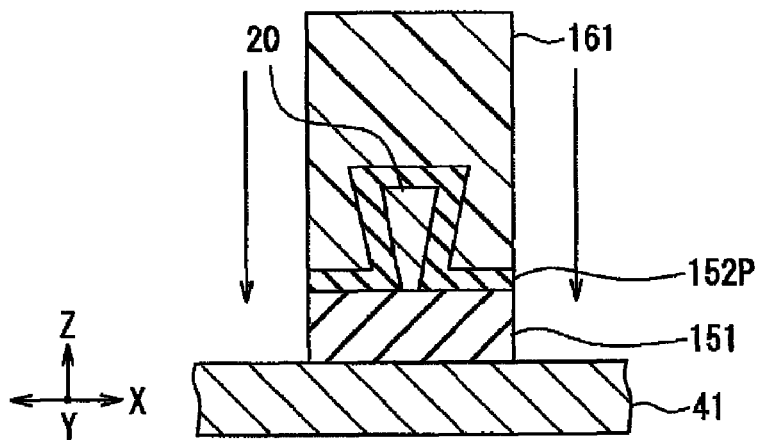
FIG. 30 is an explanatory diagram showing a step that follows the step shown in FIG. 29.
Figure 31:
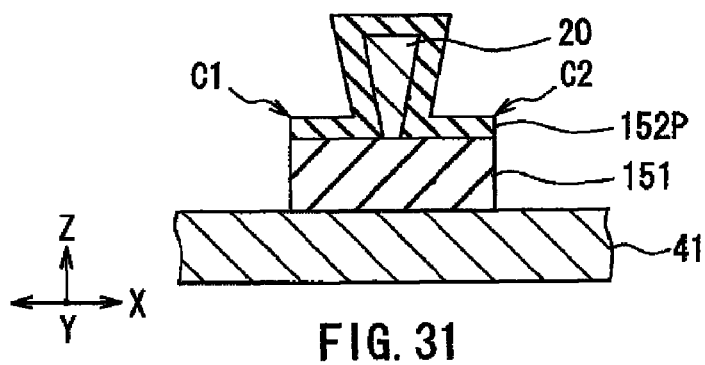
FIG. 31 is an explanatory diagram showing a step that follows the step shown in FIG. 30.

FIG. 30 shows the next step. In this step, the other part of the initial side gap layer 152P which is not covered with the mask 161 and a part of the initial lower gap layer 151P that lies under that part of the initial side gap layer 152P are removed by etching. This exposes a part of the top surface of the lower shield 41, and makes the remaining initial lower gap layer 151P into a lower gap 151. The above etching is performed by RIE or ion milling, for example. The arrows in FIG. 30 indicate ion beams. Next, the mask 161 is removed as shown in FIG. 31.

Figure 32:
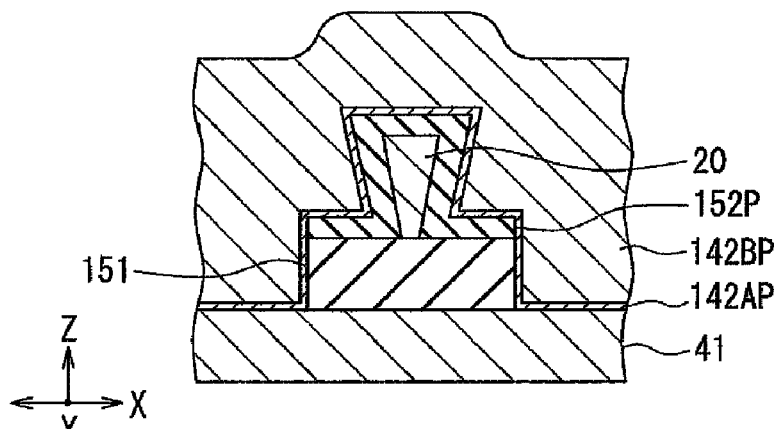
FIG. 32 is an explanatory diagram showing a step that follows the step shown in FIG. 31.

FIG. 32 shows the next step. In this step, an electrode film 142AP that functions as an electrode and seed layer for plating is formed to cover the entire stack shown in FIG. 31. The electrode film 142AP is made of a magnetic material. Next, a not-shown frame for forming two side shields is formed on the electrode film 142AP. The frame has openings in the areas where to form the two side shields. The frame is formed by patterning a photoresist layer by photolithography. Next, a plating layer 142BP made of a magnetic material is formed to fill the openings of the frame by frame plating, using the electrode film 142AP as the electrode and seed layer: The plating layer 142BP is used for forming the two side shields.

Figure 33:
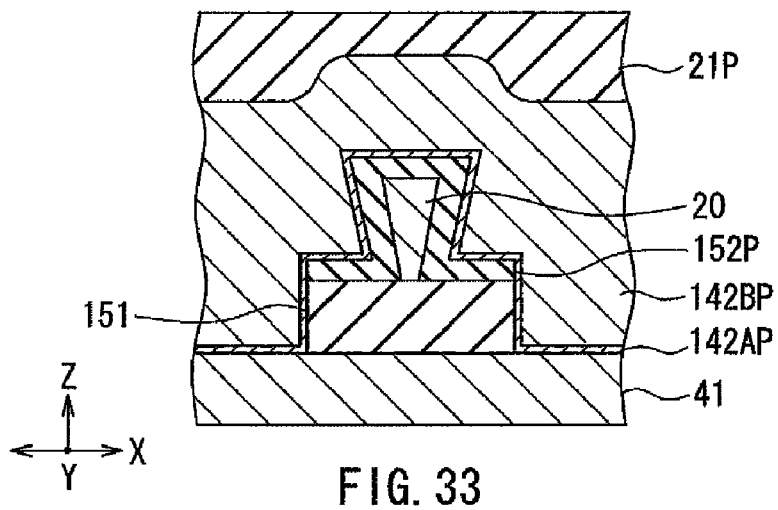
FIG. 33 is an explanatory diagram showing a step that follows the step shown in FIG. 32.

FIG. 33 shows the next step. In this step, first, the frame is removed. Next, the electrode film 142AP except the portions thereof lying under the plating layer 142BP is removed by etching. Next, a nonmagnetic film 21P that is to become the nonmagnetic layer 21 later is formed to cover the entire stack.

Figure 34:
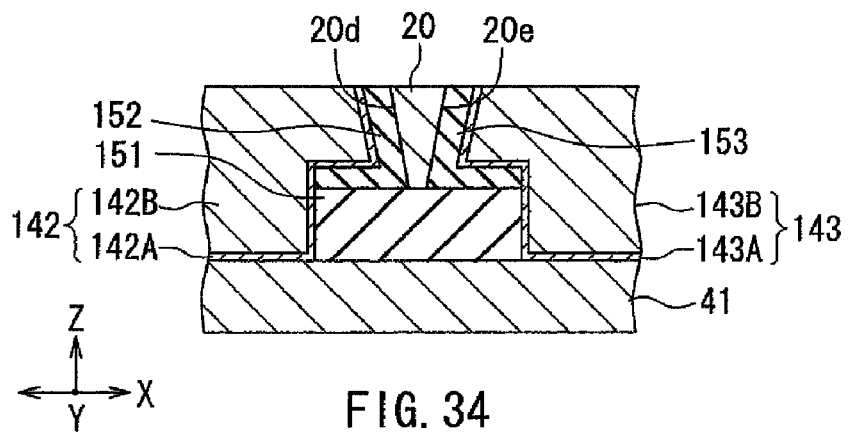
FIG. 34 is an explanatory diagram showing a step that follows the step shown in FIG. 33.

FIG. 34 shows the next step. In this step, the nonmagnetic film 21P, the plating layer 142BP, the electrode film 142AP, and the initial side gap layer 152P are polished by, for example, CMP, until the top surface of the main magnetic pole 20 is exposed. This separates the initial side gap layer 152P, the electrode film 142AP, and the plating layer 142BP into respective two portions that are located on opposite sides of the main magnetic pole 20 in the track width direction. The initial side gap layer 152P is made into a side gap 152 and a side gap 153 that are in contact with the side surface 20d and the side surface 20e of the main magnetic pole 20, respectively. The electrode film 142AP and the plating layer 142BP form side shields 142 and 143. The side shield 142 includes a first layer 142A and a second layer 142B. The side shield 143 includes a first layer 143A and a second layer 143B. The first layers 142A and 143A are formed by the two separated portions of the electrode film 142AP. The second layers 142B and 143B are formed by the two separated portions of the plating layer 142BP.

Figure 35:
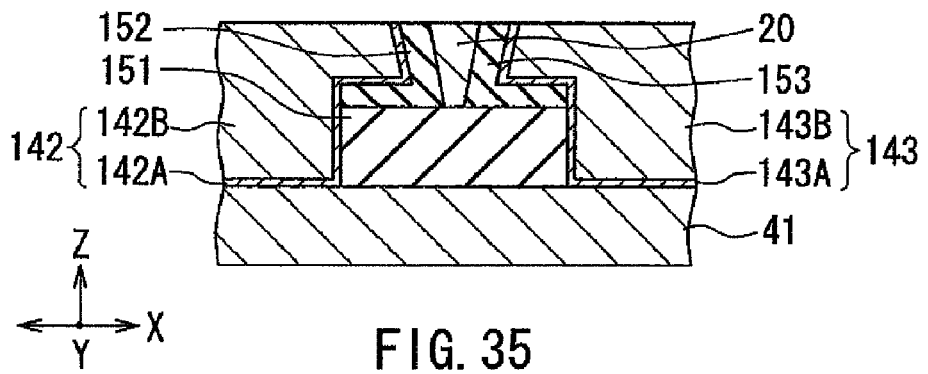
FIG. 35 is an explanatory diagram showing a step that follows the step shown in FIG. 34.
Figure 36:
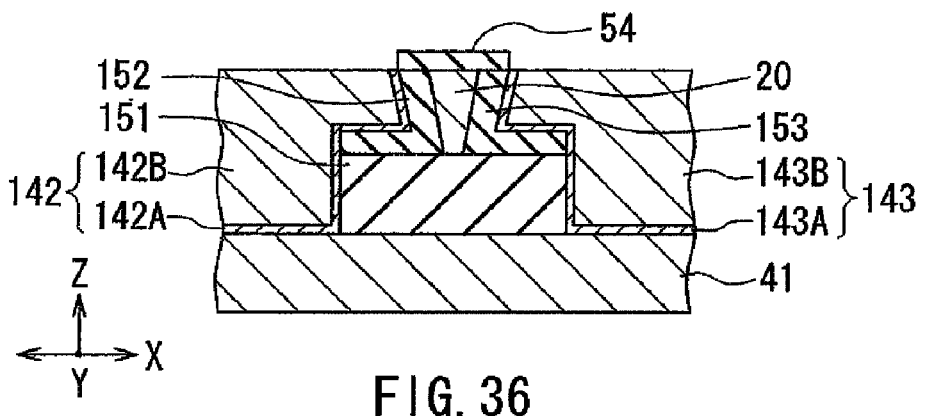
FIG. 36 is an explanatory diagram showing a step that follows the step shown in FIG. 35.
Figure 37:
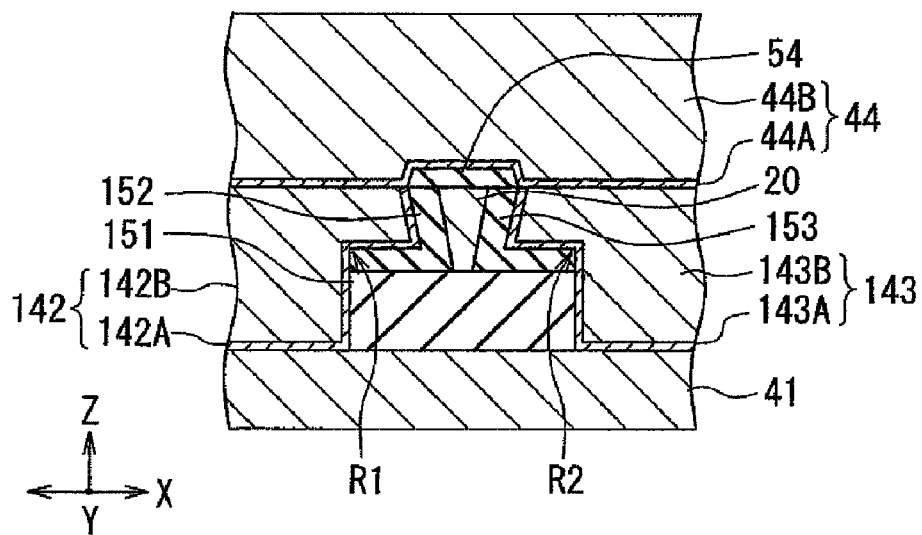
FIG. 37 is an explanatory diagram showing a step that follows the step shown in FIG. 36.

FIG. 35 shows a step that follows the step shown in FIG. 34. FIG. 36 shows a step that follows the step shown in FIG. 35. FIG. 37 shows a step that follows the step shown in FIG. 36. The steps shown in FIG. 35 to FIG. 37 are the same as those shown in FIG. 23A, FIG. 24A, and FIG. 25A, respectively. Descriptions thereof will thus be omitted. The steps of the comparative example after the formation of the upper shield 44 and the yoke layer 23 are the same as those of the present embodiment.

Now, a description will be given of first and second problems of the manufacturing method for a magnetic head of the comparative example. In the manufacturing method for a magnetic head of the comparative example, as shown in FIG. 30, the initial side gap layer 152P and the initial lower gap layer 151P are both etched in part by using the mask 161. This forms a structure that includes the lower gap 151 having a width greater than that of the main magnetic pole 20, and the main magnetic pole 20 and the initial side gap layer 152P which are arranged on the lower gap 151. In such a structure, the initial side gap layer 152P includes two portions that lie on the top surface of the lower gap 151 at positions on opposite sides of the main magnetic pole 20 in the track width direction.

The first problem of the manufacturing method for a magnetic head of the comparative example is as follows. As shown in FIG. 31, the lower gap 151 and the two portions of the initial side gap layer 152P lying on the top surface of the lower gap 151 create two corner parts C1 and C2 near the bottom surface of the main magnetic pole 20, the corner parts being formed between respective two intersecting surfaces at, e.g., right angles, and these two corner parts C1 and C2 can induce adjacent track erase. More specifically, if there are created the two corner parts C1 and C2, then two recesses R1 and R2 are formed in the two side shields 142 and 143 along the two corner parts C1 and C2 as shown in FIG. 37. Magnetic fluxes emerging from the recording medium and from the main magnetic pole 20 tend to concentrate in the vicinities of the two recesses R1 and R2, and this can induce adjacent track erase.

The second problem of the manufacturing method for a magnetic head of the comparative example is that the center of the mask 161 in the track width direction can deviate from the center of the main magnetic pole 20 in the track width direction, so that the effects of the two side shields 142 and 143 become non-equal. This point will be described in detail with reference to FIG. 38 to FIG. 40.

Figure 38:
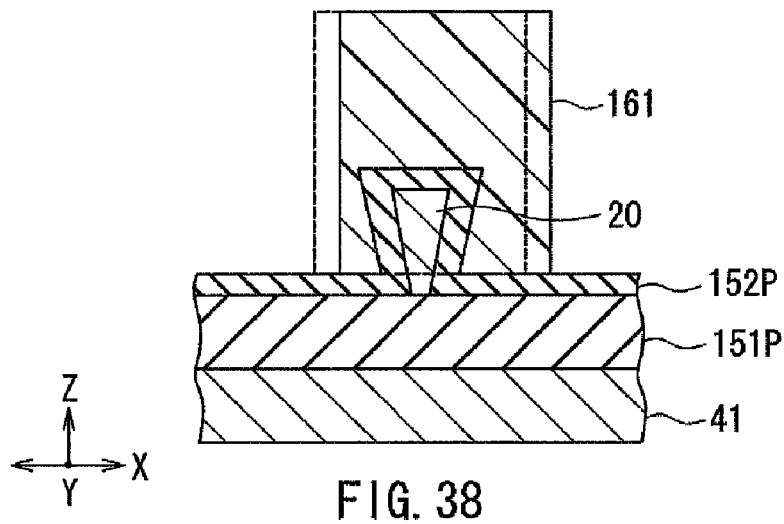
FIG. 38 is an explanatory diagram showing a case where the mask is misaligned in the step shown in FIG. 29.
Figure 39:
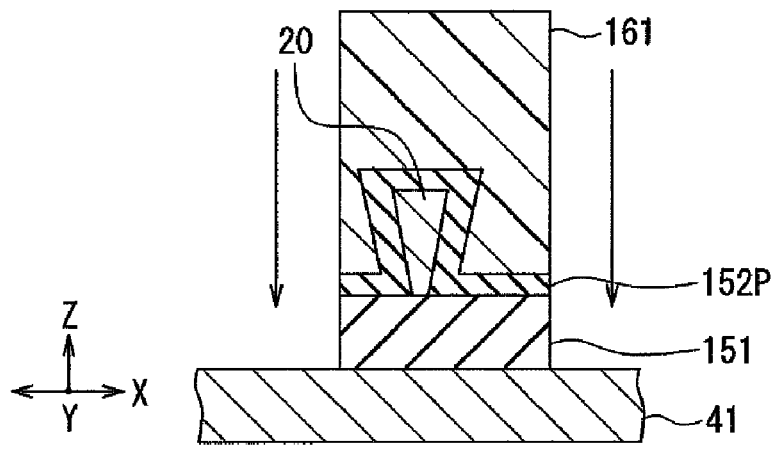
FIG. 39 is an explanatory diagram showing a step that follows the step shown in FIG. 38.
Figure 40:
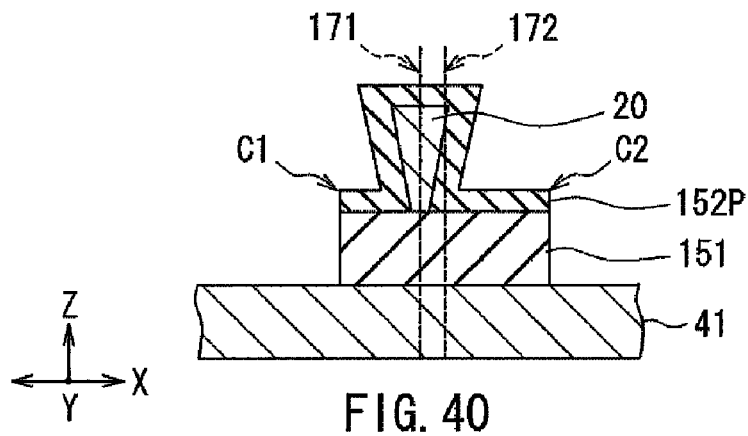
FIG. 40 is an explanatory diagram showing a step that follows the step shown in FIG. 39.

FIG. 38 is a diagram corresponding to FIG. 29, showing the state where the center of the mask 161 in the track width direction is off the center of the main magnetic pole 20 in the track width direction. In FIG. 38, the broken lines indicate the position of the mask 161 in FIG. 29. FIG. 39 is a diagram corresponding to FIG. 30, showing a step that follows the step shown in FIG. 38. FIG. 40 is a diagram corresponding to FIG. 31, showing a step that follows the step shown in FIG. 39. If the center of the mask 161 in the track width direction deviates from the center of the main magnetic pole 20 in the track width direction as shown in FIG. 38, the center 172 of the lower gap 151 in the track width direction deviates from the center 171 of the main magnetic pole 20 in the track width direction as shown in FIG. 40. Then, the distance between the surface of the side shield 142 in contact with one of the side surfaces of the lower gap 151 and the center 171 of the main magnetic pole 20 in the track width direction differs from the distance between the surface of the side shield 143 in contact with the other side surface of the lower gap 151 and the center 171 of the main magnetic pole 20 in the track width direction. This makes the effects of the two side shields 142 and 143 not equal, and can thus cause a deterioration of the characteristics of the magnetic head.

With the manufacturing method for a magnetic head according to the present embodiment, as shown in FIG. 17A, the mask 62 does not cover the entire protrusion 60 but covers only the top surface 60c of the protrusion 60, or only the top surface 60c of the protrusion 60 and the respective portions of the side surfaces 60d and 60e of the protrusion 60 that are continuous with the top surface 60c. Therefore, in the etching step shown in FIG. 18A, the positions of opposite ends of the top surface 51a of the lower gap 51 in the track width direction are determined not by the mask 62 but by the two side gaps 52 and 53 included in the protrusion 60. Consequently, in the present embodiment, the positions of opposite ends of the top surface 51a of the lower gap 51 in the track width direction coincide with the positions of opposite ends of the bottom surface 60b of the protrusion 60 in the track width direction after the etching step. According to the present embodiment, as shown in FIG. 2, no corner parts are therefore formed by the lower gap 51 and the two side gaps 52 and 53 near the bottom surface 20b of the main magnetic pole 20. Consequently, according to the present embodiment, the two side shields 42 and 43 do not have the two recesses along the two corner parts. The present embodiment thus makes it possible to suppress adjacent track erase.

In the present embodiment, the positions of opposite ends of the top surface 51a of the lower gap 51 in the track width direction are not determined by the mask 62 in the etching step shown in FIG. 18A to FIG. 18C, but are determined by the positions of opposite ends of the bottom surface 60b of the protrusion 60 in the track width direction after the etching step. The positions of opposite ends of the bottom surface 60b of the protrusion 60 in the track width direction after the etching step are almost constant even if the mask 62 is somewhat misaligned. According to the present embodiment, it is therefore possible to prevent the center of the lower gap 51 in the track width direction from deviating from the center of the main magnetic pole 20 in the track width direction even if the mask 62 is somewhat misaligned. Consequently, according to the present embodiment, it is possible to make the effects of the two side shields 42 and 43 equal.

As mentioned previously, the position of the end of the bit pattern to be recorded on the recording medium depends on the position of an edge of the end face 20a of the main magnetic pole 20 located in the medium facing surface 30, the edge being closer to the upper gap 54. The shapes of the main magnetic pole 20 and the two side gaps 52 and 53 near the top surface 20c of the main magnetic pole 20 therefore have a significant impact on the characteristics of the magnetic head. According to the present embodiment, the vicinity of the top surface 60c of the protrusion 60 is protected by the mask 62 in the etching step shown in FIG. 18A to FIG. 18C. The present embodiment thus prevents the shapes of the main magnetic pole 20 and the two side gaps 52 and 53 near the top surface 20c of the main magnetic pole 20, which have a significant impact on the characteristics of the magnetic head, from changing in the etching step. Consequently, according to the present embodiment, it is possible to prevent changes in characteristics of the magnetic head.

In the present embodiment, the positions of the lower ends of the portions of the mask 62 covering the respective portions of the side surfaces 60d and 60e of the protrusion 60 are adjustable by the amount of removal of the initial resin layer 61P in the step that has been described with reference to FIG. 15A to FIG. 15C. That is, according to the present embodiment, it is possible to adjust how far the vicinity of the top surface of the protrusion 60 is protected by the mask 62 in the etching step. According to the present embodiment, it is also possible to control the shape of the lower gap 51 by adjusting the positions of the lower ends of the portions of the mask 62 covering the respective portions of the side surfaces 60d and 60e of the protrusion 60.

Other effects of the present embodiment will now be described. In the present embodiment, as shown in FIG. 2, the width of the end face 20a of the main magnetic pole 20 located in the medium facing surface 30 decreases with decreasing distance to the top surface of the substrate 1. According to the present embodiment, it is thus possible to suppress the adjacent track erase resulting from a skew.

In the present embodiment, as shown in FIG. 1, the top surface 20c of the main magnetic pole 20 includes the first part 20c1 and the second part 20c2. The distance from the top surface of the substrate 1 to an arbitrary point on the first part 20c1 increases with increasing distance from the arbitrary point to the medium facing surface 30. Consequently, according to the present embodiment, the end face 20a of the main magnetic pole 20 located in the medium facing surface 30 can be reduced in size in the Z direction. This allows the suppression of the adjacent track erase resulting from a skew. Furthermore, the present embodiment allows the improvement of overwrite property since the main magnetic pole 20 is capable of introducing a large amount of magnetic flux to the medium facing surface 30.

In the present embodiment, as shown in FIG. 1, the distance between the bottom surface of the upper shield 44 and the second part 20c2 is greater than that between the bottom surface of the upper shield 44 and the first part 20c1. According to the present embodiment, the main magnetic pole 20 and the upper shield 44 are opposed to each other via the upper gap 54 only across a small area. This serves to prevent the upper shield 44 from being saturated with the magnetic field leaking from the main magnetic pole 20. Consequently, according to the present embodiment, it is possible to increase the gradient of the recording magnetic field by the function of the upper shield 44.

The present invention is not limited to the foregoing embodiment, and various modifications may be made thereto. For example, the main magnetic pole 20 of the present invention may have a flat top surface 20c without the first and second parts 20c1 and 20c2.

In the foregoing embodiment, the upper gap 54 and the upper shield 44 are formed in this order after forming the first and second side shields 42 and 43. In the present invention, however, the upper shield and the first and second side shields may be formed simultaneously after forming the upper gap.

While the foregoing embodiment has been described with reference to a magnetic head having a structure in which the reproducing head is formed on the base body and the recording head is stacked on the reproducing head, the reproducing head and the recording head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A manufacturing method for a magnetic head for perpendicular magnetic recording, the magnetic head comprising:

a medium facing surface that faces a recording medium;
a coil that produces a magnetic field corresponding to data to be recorded on the recording medium;
a main magnetic pole that has an end face located in the medium facing surface, allows a magnetic flux corresponding to the magnetic field produced by the coil to pass, and produces a recording magnetic field for recording the data on the recording medium by means of a perpendicular magnetic recording system;
a shield having an end face that is located in the medium facing surface to wrap around the end face of the main magnetic pole; and
a gap made of a nonmagnetic material and provided between the main magnetic pole and the shield, wherein:
the main magnetic pole has a first side surface and a second side surface that are located at opposite ends in a track width direction;
the shield includes a lower shield, an upper shield, and first and second side shields;
the gap includes a lower gap, an upper gap, and first and second side gaps;
the lower gap, the main magnetic pole, the upper gap, and the upper shield are arranged in this order on the lower shield;
the first side gap is in contact with the first side surface of the main magnetic pole;
the second side gap is in contact with the second side surface of the main magnetic pole;
the first side shield is located at such a position as to sandwich the first side gap between itself and the first side surface of the main magnetic pole, and is magnetically coupled to the lower shield and the upper shield; and
the second side shield is located at such a position as to sandwich the second side gap between itself and the second side surface of the main magnetic pole, and is magnetically coupled to the lower shield and the upper shield,
the manufacturing method comprising the steps of:
forming the lower shield;
forming a structure on the lower shield, the structure including the lower gap, the main magnetic pole and the first and second side gaps;

forming the first and second side shields;
forming the upper gap;
forming the upper shield; and
forming the coil,
wherein the step of forming the structure includes:
the step of forming an initial lower gap layer on the lower shield, the initial lower gap layer including a pre-lower-gap portion that is intended to later become the lower gap, and two to-be-removed portions that are located on opposite sides of the pre-lower-gap portion in the track width direction and intended to be removed later;
the step of forming the main magnetic pole on the pre-lower-gap portion;
the step of forming the first and second side gaps on the first and second side surfaces of the main magnetic pole so that a protrusion is produced on the pre-lower-gap portion, the protrusion including the main magnetic pole and the first and second side gaps and protruding upward from a top surface of the initial lower gap layer;
the step of forming a resin layer so as not to lie on a top surface of the protrusion but to lie on opposite sides of the protrusion in the track width direction, in contact with opposite side surfaces of the protrusion in the track width direction, the resin layer being developer-soluble and non-photosensitive;
the step of forming a photoresist layer to cover the resin layer and the protrusion;
the step of patterning the photoresist layer by photolithography including exposure and development, thereby forming a mask that covers the top surface of the protrusion and removing the resin layer by dissolution in a developer that is used in the development; and
an etching step of etching the initial lower gap layer in part with the top surface of the protrusion covered with the mask, so that the two to-be-removed portions are removed and the pre-lower-gap portion becomes the lower gap,
and wherein, in the medium facing surface, positions of opposite ends of a top surface of the lower gap in the track width direction coincide with positions of opposite ends of a bottom surface of the protrusion in the track width direction after the etching step.

2. The manufacturing method for a magnetic head according to claim 1, wherein a width of the mask in the track width direction is greater than a width of the top surface of the protrusion in the track width direction.

3. The manufacturing method for a magnetic head according to claim 2, wherein a top surface of the resin layer has a maximum height lower than the top surface of the protrusion, and the mask covers the top surface of the protrusion and respective portions of the side surfaces of the protrusion that are continuous with the top surface.

4. The manufacturing method for a magnetic head according to claim 1, wherein the step of forming the resin layer includes the steps of: forming an initial resin layer to cover the top surface and the side surfaces of the protrusion, the initial resin layer being intended to later become the resin layer; and partially removing the initial resin layer so that the top surface of the protrusion is exposed and the initial resin layer becomes the resin layer.

5. The manufacturing method for a magnetic head according to claim 1, wherein:
the step of forming the first and second side gaps forms an initial side gap layer that includes the first and second side gaps and two unnecessary portions, the two unnecessary portions being located on the two to-be-removed portions of the initial lower gap layer and intended to be removed later; and
the etching step removes the two unnecessary portions of the initial side gap layer so that a shape of the protrusion after the etching step is determined.

6. The manufacturing method for a magnetic head according to claim 1, wherein, after the etching step, a width of the bottom surface of the protrusion in the track width direction is smaller than a width of the top surface of the protrusion in the track width direction.

7. The manufacturing method for a magnetic head according to claim 1, further comprising the step of etching the top surface of the main magnetic pole in part, to be performed between the step of forming the structure and the step of forming the upper gap.

* * * * *